US009810938B2

(12) United States Patent
Kuriyama et al.

(10) Patent No.: US 9,810,938 B2
(45) Date of Patent: *Nov. 7, 2017

(54) LIQUID CRYSTAL DISPLAY DEVICE

(71) Applicant: DIC CORPORATION, Tokyo (JP)

(72) Inventors: Takeshi Kuriyama, Kita-adachi-gun (JP); Jouji Kawamura, Kita-adachi-gun (JP); Hiroshi Maki, Sakura (JP); Junichiro Koike, Sakura (JP); Masami Shishikura, Sakura (JP); Ryosuke Asami, Sakura (JP)

(73) Assignee: DIC CORPORATION, Tokyo (JP)

( * ) Notice: Subject to any disclaimer, the term of this patent is extended or adjusted under 35 U.S.C. 154(b) by 208 days.

This patent is subject to a terminal disclaimer.

(21) Appl. No.: 14/408,444

(22) PCT Filed: Nov. 29, 2013

(86) PCT No.: PCT/JP2013/082193
§ 371 (c)(1),
(2) Date: Dec. 16, 2014

(87) PCT Pub. No.: WO2015/079561
PCT Pub. Date: Jun. 4, 2015

(65) Prior Publication Data
US 2016/0252772 A1 Sep. 1, 2016

(51) Int. Cl.
*G02F 1/1335* (2006.01)
*C09K 19/20* (2006.01)
(Continued)

(52) U.S. Cl.
CPC ........ *G02F 1/133514* (2013.01); *C09K 19/20* (2013.01); *C09K 19/3066* (2013.01);
(Continued)

(58) Field of Classification Search
CPC .................................................. G02F 1/133514
See application file for complete search history.

(56) References Cited

U.S. PATENT DOCUMENTS 5,378,274 A   1/1995 Yokoyama et al.
5,831,701 A   11/1998 Matsuyama et al.
(Continued)

FOREIGN PATENT DOCUMENTS

CN   1784481 A    6/2006
CN   101790573 A  7/2010
(Continued)

OTHER PUBLICATIONS

International Search Report dated Feb. 25, 2014, issued in corresponding application No. PCT/JP2013/082913.
(Continued)

*Primary Examiner* — Cynthia H Kelly
*Assistant Examiner* — Anna Malloy
(74) *Attorney, Agent, or Firm* — Westerman, Hattori, Daniels & Adrian, LLP

(57) ABSTRACT

A liquid crystal display device that prevents a decrease in the voltage holding ratio (VHR) and an increase in the ion density (ID) in a liquid crystal layer and that resolves the problems of display defects, such as white streaks, variations in alignment, and image sticking. The liquid crystal display has features of preventing a decrease in the voltage holding ratio (VHR) and an increase in the ion density (ID) in a liquid crystal layer and suppressing display defects such as image sticking. Therefore, the liquid crystal display device is particularly useful for active matrix driving liquid crystal display devices with an IPS mode or an FFS mode and can be applied to liquid crystal display devices of, for example, liquid crystal televisions, monitors, cellular phones, and smart phones.

11 Claims, 2 Drawing Sheets

(51) Int. Cl.

| | | |
|---|---|---|
| *C09K 19/30* | (2006.01) | |
| *G02F 1/1333* | (2006.01) | |
| *G02F 1/1337* | (2006.01) | |
| *G02F 1/1341* | (2006.01) | |
| *G02F 1/1343* | (2006.01) | |
| *C09K 19/04* | (2006.01) | |
| *C09K 19/12* | (2006.01) | |
| *C09K 19/34* | (2006.01) | |

(52) U.S. Cl.
CPC .......... *G02F 1/1337* (2013.01); *G02F 1/1341* (2013.01); *G02F 1/13439* (2013.01); *G02F 1/133365* (2013.01); *G02F 1/133512* (2013.01); *G02F 1/134309* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3025* (2013.01); *C09K 2019/3422* (2013.01)

(56) References Cited

U.S. PATENT DOCUMENTS

| | | | |
|---|---|---|---|
| 7,936,428 B2 | 5/2011 | Takahashi et al. | |
| 8,178,173 B1 | 5/2012 | Matsumoto et al. | |
| 8,804,092 B2 | 8/2014 | Klement et al. | |
| 8,860,912 B2 | 10/2014 | Kaneoya et al. | |
| 8,885,124 B2 | 11/2014 | Kaneoya et al. | |
| 9,120,968 B2 | 9/2015 | Kaneoya et al. | |
| 9,285,628 B2* | 3/2016 | Kuriyama | C09K 19/20 |
| 9,410,084 B2* | 8/2016 | Kuriyama | C09K 19/54 |
| 9,436,032 B2* | 9/2016 | Kuriyama | C09K 19/20 |
| 9,459,488 B2* | 10/2016 | Kuriyama | C09K 19/20 |
| 2004/0017533 A1 | 1/2004 | Sumino | |
| 2005/0190316 A1 | 9/2005 | Takahashi et al. | |
| 2006/0257763 A1 | 11/2006 | Araki | |
| 2009/0162576 A1 | 6/2009 | Lee et al. | |
| 2010/0097562 A1 | 4/2010 | Park et al. | |
| 2010/0271569 A1 | 10/2010 | Ohkuma et al. | |
| 2010/0309423 A1 | 12/2010 | Bematz et al. | |
| 2011/0058138 A1 | 3/2011 | Huh et al. | |
| 2011/0297881 A1 | 12/2011 | Hirata et al. | |
| 2012/0032112 A1* | 2/2012 | Czanta | C09K 19/42 |
| | | | 252/299.64 |
| 2012/0262653 A1* | 10/2012 | Shimizu | G02F 1/133707 |
| | | | 349/106 |
| 2015/0232757 A1 | 8/2015 | Kaneoya et al. | |
| 2015/0232758 A1 | 8/2015 | Kuriyama et al. | |
| 2015/0344778 A1* | 12/2015 | Kuriyama | C09K 19/20 |
| | | | 349/106 |

FOREIGN PATENT DOCUMENTS

| | | |
|---|---|---|
| CN | 101817992 A | 9/2010 |
| CN | 103069316 A | 4/2013 |
| EP | 2 796 922 A1 | 10/2014 |
| JP | H09-43589 A | 2/1997 |
| JP | 2000-019321 A | 1/2000 |
| JP | 2000-192040 A | 7/2000 |
| JP | 2003-295169 A | 10/2003 |
| JP | 2006-317602 A | 11/2006 |
| JP | 2007-133131 A | 5/2007 |
| JP | 2008-144105 A | 6/2008 |
| JP | 2009-007432 A | 1/2009 |
| JP | 2009-058546 A | 3/2009 |
| JP | 2009-109542 A | 5/2009 |
| JP | 2009-163014 A | 7/2009 |
| JP | 2010-189560 A | 9/2010 |
| JP | 2010-250117 A | 11/2010 |
| JP | 2010-256509 A | 11/2010 |
| JP | 2010-260997 A | 11/2010 |
| JP | 2010-537256 A | 12/2010 |
| JP | 2011-118139 A | 6/2011 |
| JP | 2011-141356 A | 7/2011 |
| JP | 2011-186043 A | 9/2011 |
| JP | 2012-032697 A | 2/2012 |
| JP | 2012-068630 A | 4/2012 |
| JP | 2013-096944 A | 5/2013 |
| JP | 5273494 B1 | 8/2013 |
| JP | 5321932 B1 | 10/2013 |
| KR | 10-0286582 | 2/1994 |
| KR | 2009-0068709 A | 6/2009 |
| TW | 200621898 A | 7/2006 |
| WF | 2004/099343 A1 | 11/2004 |
| WO | 2004/099343 A1 | 11/2004 |
| WO | 2010/095506 A1 | 8/2010 |

OTHER PUBLICATIONS

Written Opinion dated Feb. 25, 2014, issued in corresponding application No. PCT/JP2013/082913.
Non-Final Office Action dated Aug. 17, 2015, issued in U.S. Appl. No. 14/114,848.
Notice of Allowance dated Nov. 4, 2015, issued in U.S. Appl. No. 14/114,848.
Notice of Allowance dated Jun. 9, 2016, issued in U.S. Appl. No. 14/654,308.
International Search Report dated Aug. 20, 2013, issued in International Patent Application No. PCT/JP2013/066687, counterpart of U.S. Appl. No. 14/429,299.
International Search Report dated May 7, 2013, issued in International Patent Application No. PCT/JP2013/054351, counterpart of U.S. Appl. No. 14/350,501.
International Search Report dated Mar. 5, 2013, issued in International Patent Application No. PCT/JP2013/051079, counterpart of U.S. Appl. No. 14/114,848.
International Search Report dated Aug. 20, 2013, issued in International Patent Application No. PCT/JP2013/066686, counterpart of U.S. Appl. No. 14/654,308.
Non-Final Office Action dated Sep. 29, 2015, issued in U.S. Appl. No. 14/429,299.
Notice of Allowance dated Feb. 1, 2016, issued in U.S. Appl. No. 14/429,299.
Notice of Allowance dated Mar. 25, 2016, issued in U.S. Appl. No. 14/429,299.
Notice of Allowance dated May 5, 2016, issued in U.S. Appl. No. 14/429,299.
Non-Final Office Action dated Oct. 9, 2015, issued in U.S. Appl. No. 14/350,501.
Notice of Allowance dated Feb. 25, 2016, issued in U.S. Appl. No. 14/350,501.
Notice of Allowance dated Jun. 8, 2016, issued in U.S. Appl. No. 14/350,501.
Non-Final Office Action dated Aug. 17, 2015, issued in U.S. Appl. No. 14/114,848.
Notice of Allowance dated Nov. 4, 2015, issued in U.S. Appl. No. 14/114,848.
Non-Final Office Action dated Feb. 11, 2016, issued in U.S. Appl. No. 14/654,308.
Notice of Allowance dated Jun. 9, 2016, issued in U.S. Appl No. 14/654,308.

* cited by examiner

LIQUID CRYSTAL DISPLAY DEVICE

TECHNICAL FIELD

The present invention relates to a liquid crystal display device.

BACKGROUND ART

Liquid crystal display devices have been used for clocks, calculators, household electric appliances, measuring instruments, panels for automobiles, word processors, electronic organizers, printers, computers, televisions, etc. Typical examples of a liquid crystal display mode include a TN (twisted nematic) mode, an STN (super twisted nematic) mode, a DS (dynamic scattering) mode, a GH (guest-host) mode, an IPS (in-plane switching) mode, an OCB (optically compensated birefringence) mode, an ECB (electrically controlled birefringence) mode, a VA (vertical alignment) mode, a CSH (color super-homeotropic) mode, and FLC (ferroelectric liquid crystal). The driving method has been changed from conventional static driving to multiplex driving, and passive matrix driving and, recently, active matrix (AM) driving performed using, for example, TFTs (thin film transistors) and TFDs (thin film diodes) have become the predominantly used driving method.

Referring to FIG. 1, a typical liquid crystal color display device includes two substrates (1) each having an alignment film (4), a transparent electrode layer (3a) serving as a common electrode and a color filter layer (2) which are disposed between one of the substrates and the alignment film of the one substrate, and a pixel electrode layer (3b) between the other substrate and the alignment film of that other substrate. The substrates are arranged so that the alignment films face each other and a liquid crystal layer (5) is sandwiched between the alignment films.

The color filter layer is constituted by a color filter that includes a black matrix, a red colored layer (R), a green colored layer (G), a blue colored layer (B), and, if needed, a yellow colored layer (Y).

Liquid crystal materials constituting such liquid crystal layers have been subjected to high levels of impurity control since impurities remaining in the materials significantly affect electrical properties of display devices. Regarding the materials that form alignment films, it has been known that the alignment films come into direct contact with the liquid crystal layer and impurities remaining in alignment films migrate to the liquid crystal layer, so that the impurities affect electrical properties of the liquid crystal layer. Studies are now being conducted in order to determine the properties of liquid crystal display devices affected by the impurities in the alignment film materials.

Materials, such as organic pigments, used in the color filter layer are also presumed to affect the liquid crystal layer due to impurities contained in the materials as with the case of the alignment film materials. However, since an alignment film and a transparent electrode are interposed between the color filter layer and the liquid crystal layer, the direct effects on the liquid crystal layer have been considered to be significantly low compared to those of the alignment film materials. However, alignment films are usually as thin as 0.1 µm or less in thickness. Transparent electrodes that serve as color-filter-layer-side common electrodes are thick so as to enhance the electrical conductivity; however, the thickness thereof is usually only as large as 0.5 µm or less. Accordingly, the color filter layer and the liquid crystal layer are not completely separated from each other. There is a possibility that impurities contained in the color filter layer may migrate through the alignment film and the transparent electrode and cause a decrease in the voltage holding ratio (VHR) and an increase in the ion density (ID) in the liquid crystal layer, thereby leading to display defects such as white streaks, variations in alignment, and image sticking.

Studies have been conducted to find a way to resolve display defects caused by impurities contained in pigments in color filters: a method of controlling release of impurities into liquid crystals by using a pigment in which the content of extracts obtained with ethyl formate is limited to a particular value or less (PTL 1) and a method of controlling release of impurities into liquid crystals by specifying the pigment in the blue colored layer (PTL 2). However, these methods do not differ much from simply decreasing the amounts of impurities in the pigment and fail to provide sufficient improvements that resolve the display defects even under the recent progress in pigment purification technologies.

Also disclosed are a method that focuses on the relationship between organic impurities contained in the color filter and a liquid crystal composition, in which insolubility of the organic impurities in the liquid crystal layer is indicated by a hydrophobicity parameter of liquid crystal molecules contained in the liquid crystal layer and the value of this hydrophobicity parameter is controlled to a particular value or higher and a method of preparing a liquid crystal composition that contains a particular fraction or more of a liquid crystal compound having a —$OCF_3$ group at an end of the liquid crystal molecule since there is a correlation between this hydrophobicity parameter and the —$OCF_3$ group at an end of a liquid crystal molecule (PTL 3).

However, the essence of the invention disclosed in this literature is to suppress effects of impurities in the pigment on the liquid crystal layer and thus a direct relationship between the structure of the liquid crystal material and the properties of the coloring material itself such as dyes and pigments used in the color filter has not been investigated. This literature does not resolve the problems related to display defects of liquid crystal display devices that have become sophisticated.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

The present invention provides a liquid crystal display device that includes a particular liquid crystal composition and a color filter containing an organic pigment having a particular particle size distribution, to thereby prevent a decrease in the voltage holding ratio (VHR) and an increase in the ion density (ID) in the liquid crystal layer, and to resolve the problems of display defects, such as white streaks, variations in alignment, and image sticking.

Solution to Problem

The inventors of the present invention have extensively studied the combination of the color filter containing an organic pigment and the structure of the liquid crystal material constituting the liquid crystal layer to address the problems described above. As a result, the inventors have found that a liquid crystal display device that includes a particular liquid crystal material and a color filter containing an organic pigment having a particular particle size distribution is capable of preventing a decrease in the voltage holding ratio (VHR) and an increase in the ion density (ID) in the liquid crystal layer and resolving the problems of display defects such as white streaks, variations in alignment, and image sticking. Thus, the inventors have accomplished the present invention.

That is, the present invention provides a liquid crystal display device including a first substrate, a second substrate, a liquid crystal composition layer sandwiched between the first substrate and the second substrate, a color filter constituted by a black matrix and at least RGB three-color pixel portions, a pixel electrode, and a common electrode, wherein the liquid crystal composition layer contains a liquid crystal composition that contains one or more compounds represented by general formula (I),

[Chem. 1]

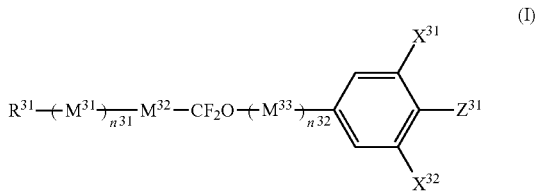

(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— in the trans-1,4-cyclohexylene group may be substituted with —O— unless oxygen atoms are directly next to each other, and one or two hydrogen atoms in the phenylene group may be substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and when a plurality of $M^{31}$ and $M^{33}$ are present, the plurality of $M^{31}$ may be the same or different and the plurality of $M^{33}$ may be the same or different) and that contains one or more compounds selected from the group consisting of compounds represented by general formula (II-a) to general formula (II-f),

[Chem. 2]

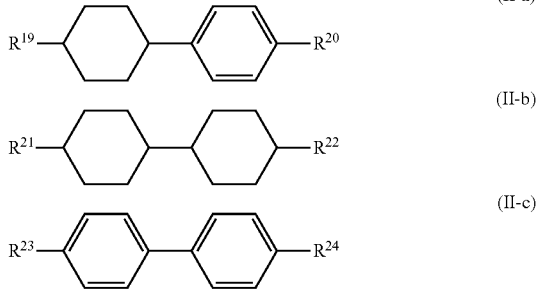

(II-a)

(II-b)

(II-c)

-continued

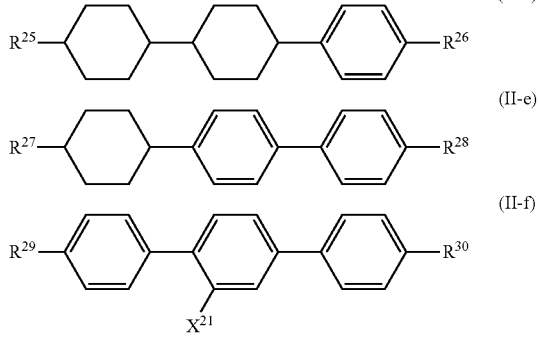

(II-d)

(II-e)

(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), the color filter is a color filter containing an organic pigment, and in the color filter, a volume fraction of particles having a particle size of more than 1000 nm relative to all particles of the organic pigment is 1% or less, and a volume fraction of particles having a particle size of 40 nm or more and 1000 nm or less relative to all particles of the organic pigment is 25% or less.

Advantageous Effects of Invention

A liquid crystal display device according to the present invention includes a particular liquid crystal composition and a color filter that contains an organic pigment having a particular particle size distribution, so that a decrease in the voltage holding ratio (VHR) and an increase in the ion density (ID) in the liquid crystal layer can be prevented and display defects such as white streaks, variations in alignment, and image sticking can be prevented.

Figure 1:
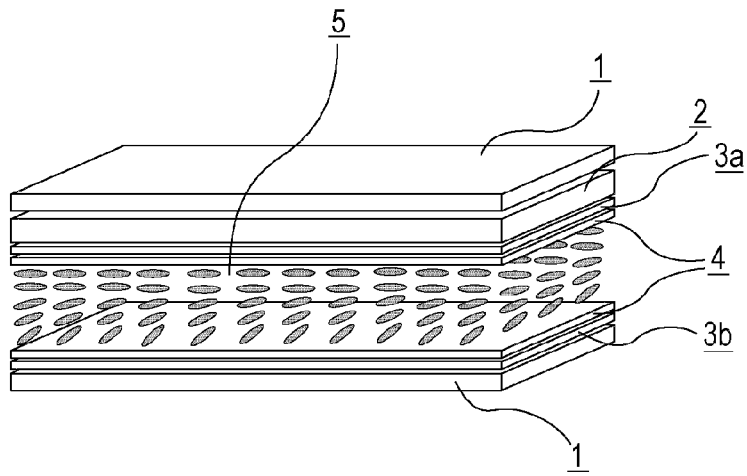
FIG. 1 is a diagram showing an example of a conventional typical liquid crystal display device.

REFERENCE SIGNS LIST 1 substrate
2 color filter layer
2a color filter layer containing an organic pigment having a particular particle size distribution
3a transparent electrode layer (common electrode)
3b pixel electrode layer
4 alignment film
5 liquid crystal layer
5a liquid crystal layer containing a particular liquid crystal composition

DESCRIPTION OF EMBODIMENTS

Figure 2:
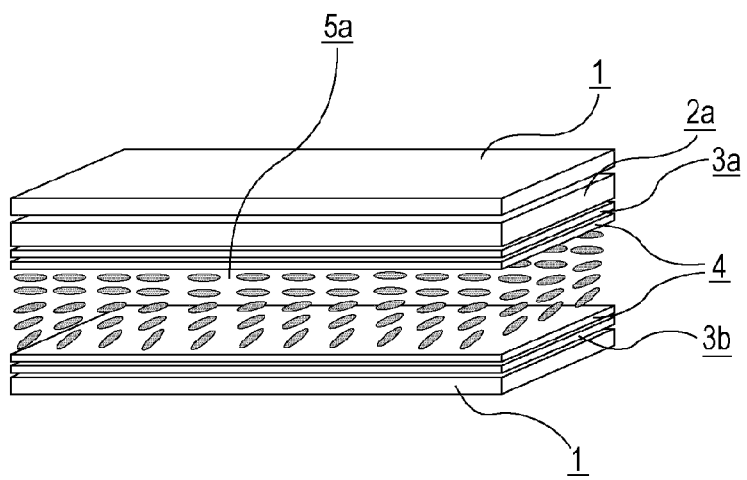
FIG. 2 is a diagram showing an example of a liquid crystal display device according to the present invention.

FIG. 2 shows an example of a liquid crystal display device according to the present invention. A transparent electrode layer (3a) that serves as a common electrode and a color filter layer (2a) that contains an organic pigment having a particular particle size distribution are disposed between one of two substrates (1), i.e., a first substrate and a second substrate, each having an alignment film (4), and the alignment film of that one substrate. A pixel electrode layer (3b) is disposed between the other substrate and the alignment film of that substrate. These substrates are arranged so that the alignment films face each other and a liquid crystal layer (5a) containing a particular liquid crystal composition is sandwiched between the alignment films.

The two substrates of the display device are bonded to each other with a sealer and a sealing material disposed in the peripheral region. In most cases, granular spacers or resin spacer columns formed by photolithography are disposed between the two substrates to maintain the substrate-to-substrate distance.

(Liquid Crystal Layer)

A liquid crystal layer in a liquid crystal display device according to the present invention contains a liquid crystal composition that contains one or more compounds represented by general formula (I),

[Chem. 3]

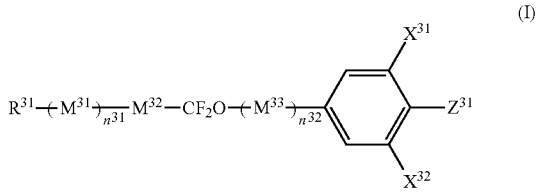

(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —CH$_2$— in the trans-1,4-cyclohexylene group may be substituted with —O— unless oxygen atoms are directly next to each other, and one or two hydrogen atoms in the phenylene group may be substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and when a plurality of $M^{31}$ and $M^{33}$ are present, the plurality of $M^{31}$ may be the same or different and the plurality of $M^{33}$ may be the same or different) and that contains one or more compounds selected from the group consisting of compounds represented by general formula (II-a) to general formula (II-f),

[Chem. 4]

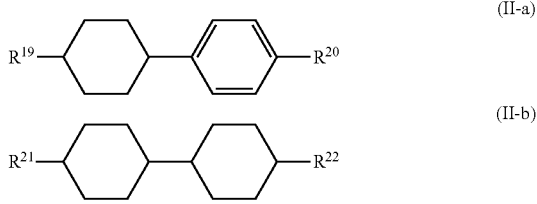

(II-a)

(II-b)

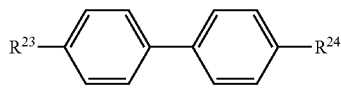

(II-c)

(II-d)

(II-e)

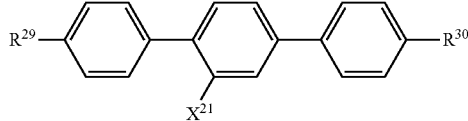

(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom).

In general formula (I), when the ring structure to which $R^{31}$ bonds is a phenyl group (aromatic group), $R^{31}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{31}$ bonds is a saturated ring structure such as cyclohexane, pyran, or dioxane, $R^{31}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{31}$ preferably represents an alkyl group. When an importance is given to production of a liquid crystal display element having high response speed due to low viscosity, $R^{31}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{31}$ preferably represents an alkoxy group as one solution strategy. In another solution strategy, multiple types of $R^{31}$ are preferably used together. For example, $R^{31}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms. $M^{31}$ to $M^{33}$ preferably have the following structures.

[Chem. 5]

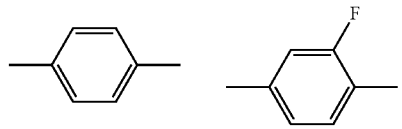

-continued

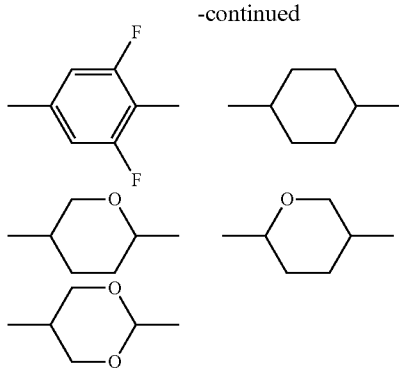

$M^{31}$ preferably has the following structures.

[Chem. 6]

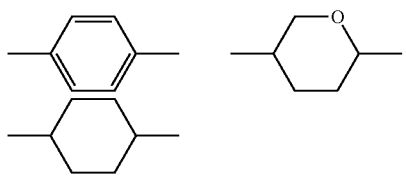

$M^{31}$ more preferably has the following structures.

[Chem. 7]

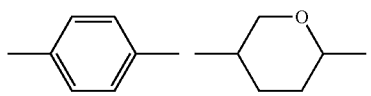

$M^{32}$ preferably has the following structures.

[Chem. 8]

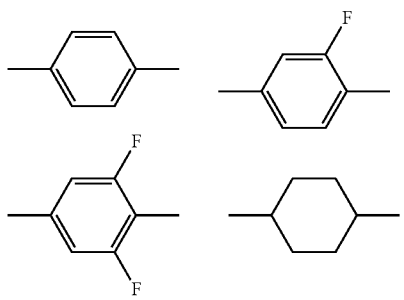

$M^{32}$ more preferably has the following structures.

[Chem. 9]

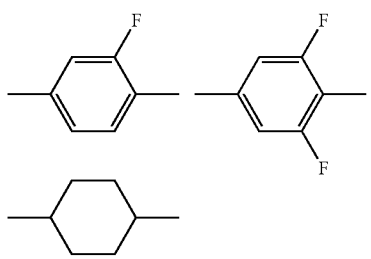

$M^{32}$ further preferably has the following structures.

[Chem. 10]

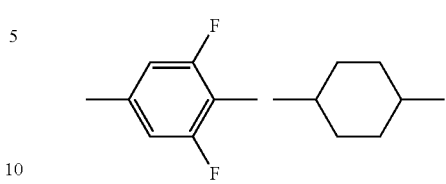

$M^{33}$ preferably has the following structures.

[Chem. 11]

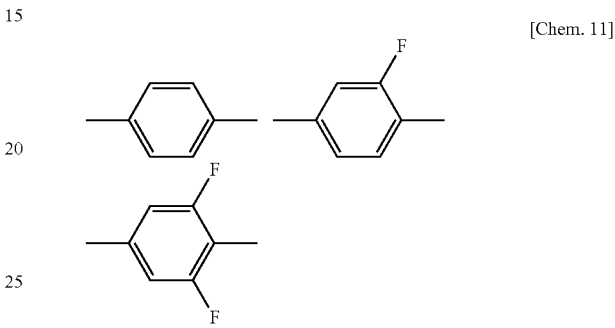

$M^{33}$ more preferably has the following structures.

[Chem. 12]

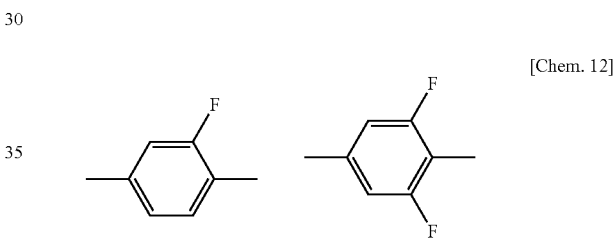

$M^{33}$ further preferably has the following structure.

[Chem. 13]

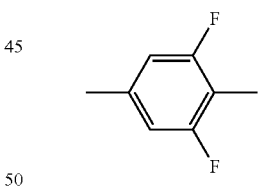

At least one of $X^{31}$ and $X^{32}$ preferably represents a fluorine atom and both of $X^{31}$ and $X^{32}$ more preferably represent fluorine atoms.

$Z^{31}$ preferably represents a fluorine atom or a trifluoromethoxy group.

Regarding the combination of $X^{31}$, $X^{32}$, and $Z^{31}$, in one embodiment, $X^{31}$=F, $X^{32}$=F, and $Z^{31}$=F. In another embodiment, $X^{31}$=F, $X^{32}$=H, and $Z^{31}$=F. In still another embodiment, $X^{31}$=F, $X^{32}$=H, and $Z^{31}$=OCF$_3$. In still another embodiment, $X^{31}$=F, $X^{32}$=F, and $Z^{31}$=OCF$_3$. In still another embodiment, $X^{31}$=H, $X^{32}$=H, and $Z^{31}$=OCF$_3$.

$n^{31}$ preferably represents 1 or 2, $n^{32}$ preferably represents 0 or 1 and more preferably 0, and $n^{31}$+$n^{32}$ preferably represents 1 or 2 and more preferably 2.

One to eight of the compounds represented by the general formula (I) are preferably contained, and one to five of the compounds are particularly preferably contained. The content of the compounds is preferably 3 to 50 mass % and more preferably 5 to 40 mass %.

More specifically, the compounds represented by the general formula (I) are preferably compounds represented by general formula (I-a) to general formula (I-f) below.

[Chem. 14]

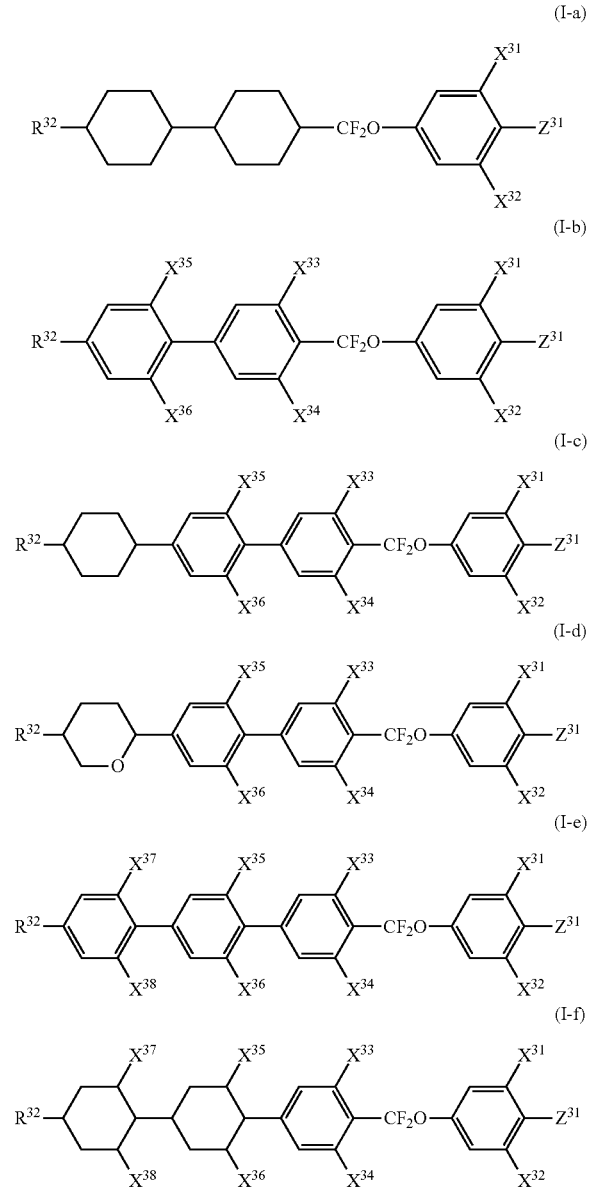

(In the formulae, $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, $X^{31}$ to $X^{38}$ each independently represent a hydrogen atom or a fluorine atom, and $Z^{31}$ represents a fluorine atom, a trifluoromethoxy group, or a trifluoromethyl group.)

In the general formula (Ia) to the general formula (If), when the ring structure to which $R^{32}$ bonds is a phenyl group (aromatic group), $R^{32}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{32}$ bonds is a saturated ring structure such as cyclohexane, pyran, or dioxane, $R^{32}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{31}$ preferably represents an alkyl group. When an importance is given to production of a liquid crystal display element having high response speed due to low viscosity, $R^{31}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{31}$ preferably represents an alkoxy group as one solution strategy. In another solution strategy, multiple types of $R^{31}$ are preferably used together. For example, $R^{31}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

At least one of $X^{31}$ and $X^{32}$ preferably represents a fluorine atom and both of $X^{31}$ and $X^{32}$ more preferably represent fluorine atoms.

$Z^{31}$ preferably represents a fluorine atom or a trifluoromethoxy group.

Regarding the combination of $X^{31}$, $X^{32}$, and $Z^{31}$, in one embodiment, $X^{31}$=F, $X^{32}$=F, and $Z^{31}$=F. In another embodiment, $X^{31}$=F, $X^{32}$=H, and $Z^{31}$=F. In still another embodiment, $X^{31}$=F, $X^{32}$=H, and $Z^{31}$=OCF$_3$. In still another embodiment, $X^{31}$=F, $X^{32}$=F, and $Z^{31}$=OCF$_3$. In still another embodiment, $X^{31}$=H, $X^{32}$=H, and $Z^{31}$=OCF$_3$.

$n^{31}$ preferably represents 1 or 2, $n^{32}$ preferably represents 0 or 1 and more preferably 0, and $n^{31}$+$n^{32}$ preferably represents 1 or 2 and more preferably 2.

At least one of $X^{33}$ and $X^{34}$ preferably represents a fluorine atom and both of $X^{33}$ and $X^{34}$ more preferably represent fluorine atoms.

At least one of $X^{35}$ and $X^{36}$ preferably represents a fluorine atom. However, it is not preferred that both of $X^{35}$ and $X^{36}$ represent fluorine atoms in view of Tni, solubility at low temperature, and chemical stability in the form of a liquid crystal display element, though there is a good effect when Δ∈ is increased.

At least one of $X^{37}$ and $X^{38}$ preferably represents a hydrogen atom and both of $X^{37}$ and $X^{38}$ more preferably represent hydrogen atoms. It is not preferred that at least one of $X^{37}$ and $X^{38}$ represent a fluorine atom in view of Tni, solubility at low temperature, and chemical stability in the form of a liquid crystal display element.

One to eight of the compounds represented by the general formula (Ia) to the general formula (If) are preferably contained and one to five of the compounds are particularly preferably contained. The content of the compounds is preferably 3 to 50 mass % and more preferably 5 to 40 mass %.

In the general formula (IIa) to the general formula (IIf), when the ring structure to which each of $R^{19}$ to $R^{30}$ bonds is a phenyl group (aromatic group), each of $R^{19}$ to $R^{30}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which each of $R^{19}$ to $R^{30}$ bonds is a saturated ring structure such as cyclohexane, pyran, or dioxane, each of $R^{19}$ to $R^{30}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, each of $R^{19}$ to $R^{30}$ preferably represents an alkyl group. When an importance is given to production of a liquid crystal display element having high response speed due to low viscosity, each of $R^{19}$ to $R^{30}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, each of $R^{19}$ to $R^{30}$ preferably represents an alkoxy group as one solution strategy. In another solution strategy, multiple types of $R^{19}$ to $R^{30}$ are preferably used together. For example, each of $R^{19}$ to $R^{30}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

$R^{19}$ and $R^{20}$ preferably represent an alkyl group or an alkoxy group and at least one of $R^{19}$ and $R^{20}$ preferably represents an alkoxy group. More preferably, $R^{19}$ represents an alkyl group and $R^{20}$ represents an alkoxy group. Further preferably, $R^{19}$ represents an alkyl group having 3 to 5 carbon atoms and $R^{20}$ represents an alkoxy group having 1 or 2 carbon atoms.

$R^{21}$ and $R^{22}$ preferably represent an alkyl group or an alkenyl group and at least one of $R^{21}$ and $R^{22}$ preferably represents an alkenyl group. A compound in which both $R^{21}$ and $R^{22}$ are alkenyl groups is suitably used to improve the response speed, but is not preferred in the case where the chemical stability of a liquid crystal display element is improved.

At least one of $R^{23}$ and $R^{24}$ preferably represents an alkyl group having 1 to 5 carbon atoms, an alkoxy group having 1 to 5 carbon atoms, or an alkenyl group having 4 or 5 carbon atoms. To achieve good balance between response speed and Tni, at least one of $R^{23}$ and $R^{24}$ preferably represents an alkenyl group. To achieve good balance between response speed and solubility at low temperature, at least one of $R^{23}$ and $R^{24}$ preferably represents an alkoxy group.

At least one of $R^{25}$ and $R^{26}$ preferably represents an alkyl group having 1 to 5 carbon atoms, an alkoxy group having 1 to 5 carbon atoms, or an alkenyl group having 2 to 5 carbon atoms. To achieve good balance between response speed and Tni, at least one of $R^{25}$ and $R^{26}$ preferably represents an alkenyl group. To achieve good balance between response speed and solubility at low temperature, at least one of $R^{25}$ and $R^{26}$ preferably represents an alkoxy group. More preferably, $R^{25}$ represents an alkenyl group and $R^{26}$ represents an alkyl group. It is also preferred that $R^{25}$ represent an alkyl group and $R^{26}$ represent an alkoxy group.

At least one of $R^{27}$ and $R^{28}$ preferably represents an alkyl group having 1 to 5 carbon atoms, an alkoxy group having 1 to 5 carbon atoms, or an alkenyl group having 2 to 5 carbon atoms. To achieve good balance between response speed and Tni, at least one of $R^{27}$ and $R^{28}$ preferably represents an alkenyl group. To achieve good balance between response speed and solubility at low temperature, at least one of $R^{27}$ and $R^{28}$ preferably represents an alkoxy group. More preferably, $R^{27}$ represents an alkyl group or an alkenyl group and $R^{28}$ represents an alkyl group. It is also preferred that $R^{27}$ represent an alkyl group and $R^{28}$ represent an alkoxy group. Furthermore, it is particularly preferred that $R^{27}$ represent an alkyl group and $R^{28}$ represent an alkyl group.

$X^{21}$ is preferably a fluorine atom.

At least one of $R^{29}$ and $R^{30}$ preferably represents an alkyl group having 1 to 5 carbon atoms or an alkenyl group having 4 or 5 carbon atoms. To achieve good balance between response speed and Tni, at least one of $R^{29}$ and $R^{30}$ preferably represents an alkenyl group. To achieve good reliability, at least one of $R^{29}$ and $R^{30}$ preferably represents an alkyl group. More preferably, $R^{29}$ represents an alkyl group or an alkenyl group and $R^{30}$ represents an alkyl group or an alkenyl group. It is also preferred that $R^{29}$ represent an alkyl group and $R^{30}$ represent an alkenyl group. Furthermore, it is also preferred that $R^{29}$ represent an alkyl group and $R^{30}$ represent an alkyl group.

One to ten of the compounds represented by the general formula (II-a) to the general formula (II-f) are preferably contained, and one to eight of the compounds are particularly preferably contained. The content of the compounds is preferably 5 to 80 mass %, more preferably 10 to 70 mass %, and particularly preferably 20 to 60 mass %.

A liquid crystal composition layer in a liquid crystal display device according to the present invention may further contain one or more compounds selected from the group consisting of compounds represented by general formula (III-a) to general formula (III-f).

[Chem. 15]

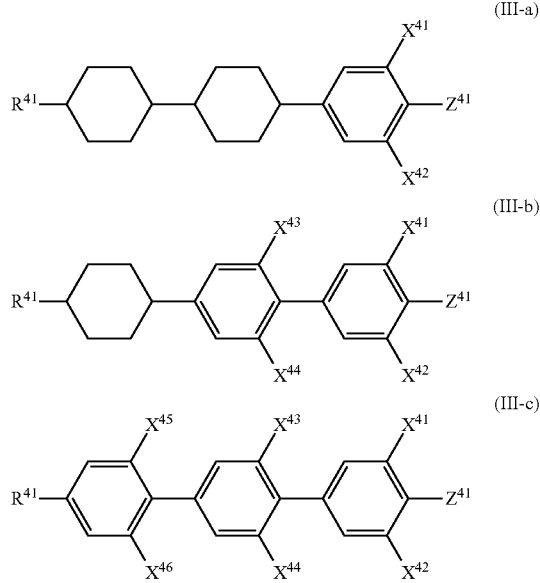

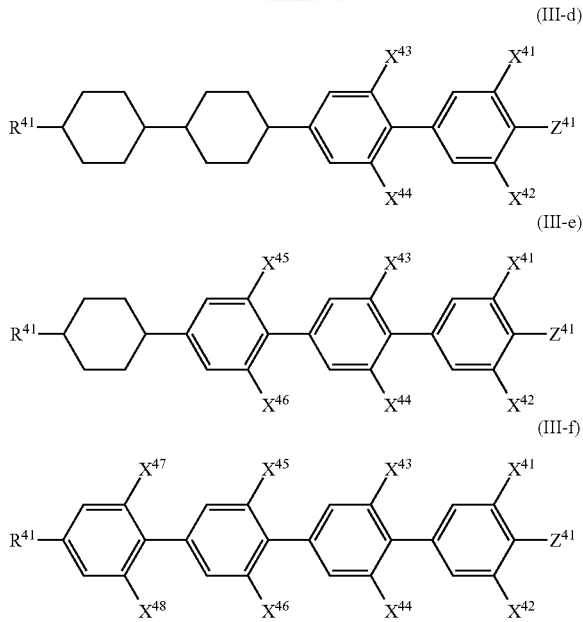

(In the formulae, $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, $X^{41}$ to $X^{48}$ each independently represent a hydrogen atom or a fluorine atom, and $Z^{41}$ represents a fluorine atom, a trifluoromethoxy group, or a trifluoromethyl group.)

In the general formula (IIIa) to the general formula (IIIf), when the ring structure to which $R^{41}$ bonds is a phenyl group (aromatic group), $R^{41}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{41}$ bonds is a saturated ring structure such as cyclohexane, pyran, or dioxane, $R^{41}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{41}$ preferably represents an alkyl group. When an importance is given to production of a liquid crystal display element having high response speed due to low viscosity, $R^{41}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{41}$ preferably represents an alkoxy group as one solution strategy. In another solution strategy, multiple types of $R^{41}$ are preferably used together. For example, $R^{41}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

At least one of $X^{41}$ and $X^{42}$ preferably represents a fluorine atom and both of $X^{41}$ and $X^{42}$ more preferably represent fluorine atoms.

$Z^{41}$ preferably represents a fluorine atom or a trifluoromethoxy group.

Regarding the combination of $X^{41}$, $X^{42}$, and $Z^{41}$, in one embodiment, $X^{41}$=F, $X^{42}$=F, and $Z^{41}$=F. In another embodiment, $X^{41}$=F, $X^{42}$=H, and $Z^{41}$=F. In still another embodiment, $X^{41}$=F, $X^{42}$=H, and $Z^{41}$=OCF$_3$. In still another embodiment, $X^{41}$=F, $X^{42}$=F, and $Z^{41}$=OCF$_3$. In still another embodiment, $X^{41}$=H, $X^{42}$=H, and $Z^{41}$=OCF$_3$.

At least one of $X^{43}$ and $X^{44}$ preferably represents a fluorine atom and both of $X^{43}$ and $X^{44}$ preferably represent fluorine atoms to increase $\Delta\in$. However, it is not preferred that both of $X^{43}$ and $X^{44}$ represent fluorine atoms in terms of improvement in solubility at low temperature.

At least one of $X^{45}$ and $X^{46}$ preferably represents a hydrogen atom and both of $X^{45}$ and $X^{46}$ more preferably represent hydrogen atoms. The use of fluorine atoms in a large amount is not preferred in view of Tni, solubility at low temperature, and chemical stability in the form of a liquid crystal display element.

At least one of $X^{47}$ and $X^{48}$ preferably represents a hydrogen atom and both of $X^{47}$ and $X^{48}$ more preferably represent hydrogen atoms. It is not preferred that at least one of $X^{47}$ and $X^{48}$ represent a fluorine atom in view of Tni, solubility at low temperature, and chemical stability in the form of a liquid crystal display element.

One to ten of the compounds selected from the group consisting of the compounds represented by the general formula (III-a) to the general formula (III-f) are preferably contained and one to eight of the compounds are more preferably contained. The content of the compounds is preferably 5 to 50 mass % and more preferably 10 to 40 mass %.

The liquid crystal composition layer in the liquid crystal display device according to the present invention may further contain one or more compounds selected from the group consisting of compounds represented by general formula (IV-a) and general formula (IV-b).

[Chem. 16]

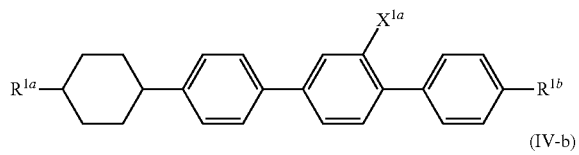

(In the formulae, $R^{1a}$ and $R^{1b}$ each independently represent an alkyl group having 1 to 10 carbon atoms, an alkoxy group having 1 to 10 carbon atoms, or an alkenyl group having 2 to 10 carbon atoms, and $X^{1a}$ represents a hydrogen atom or a fluorine atom.)

$R^{1a}$ and $R^{1b}$ preferably represent a group having 1 to 7 carbon atoms and more preferably a group having 2 to 5 carbon atoms.

One to five of the compounds selected from the group consisting of the compounds represented by the general formula (IV-a) and the general formula (IV-b) are preferably contained and one to three of the compounds are more preferably contained. The content of the compounds is preferably 1 to 50 mass % and more preferably 1 to 30 mass %.

In the liquid crystal composition layer in the liquid crystal display device according to the present invention, the total content of the compounds represented by the general formula (I) and the compounds represented by the general formula (II-a) to the general formula (II-f) is preferably 30% or more, more preferably 40% or more, more preferably 50% or more, and more preferably 60% or more. The total content is preferably 100% or less, more preferably 95% or less, more preferably 90% or less, more preferably 85% or less, and more preferably 80% or less. The total content of the compounds represented by the general formula (I), the compounds represented by the general formula (II-a) to the general formula (II-f), the compounds represented by the general formula (III-a) to the general formula (III-f), and the compounds represented by the general formula (IV-a) and the general formula (IV-b) is preferably 65% or more, more preferably 70% or more, more preferably 75% or more, and more preferably 80% or more. The total content is preferably 100% or less, more preferably 95% or less, more preferably 90% or less, and more preferably 85% or less.

In the liquid crystal composition of the liquid crystal composition layer in the liquid crystal display device according to the present invention, $\Delta\varepsilon$ at 25° C. is preferably +1.5 or more. In order to achieve high response speed, $\Delta\varepsilon$ at 25° C. is preferably +1.5 to +4.0 and more preferably +1.5 to +3.0. In order to achieve low-voltage driving, $\Delta\varepsilon$ at 25° C. is preferably +8.0 to +18.0 and more preferably +10.0 to +15.0. Furthermore, $\Delta n$ at 25° C. is preferably 0.08 to 0.14 and more preferably 0.09 to 0.13. More specifically, $\Delta n$ is preferably 0.10 to 0.13 when a small cell gap is employed and 0.08 to 0.10 when a large cell gap is employed. Moreover, $\eta$ at 20° C. is preferably 5 to 45 mPa·s, more preferably 5 to 25 mPa·s, and particularly preferably 10 to 20 mPa·s. $T_{ni}$ is preferably 60° C. to 120° C., more preferably 70° C. to 100° C., and particularly preferably 70° C. to 85° C.

In addition to the above compounds, the liquid crystal composition in the present invention may contain typical nematic liquid crystal, smectic liquid crystal, and cholesteric liquid crystal.

The liquid crystal composition in the present invention may contain at least one polymerizable compound for the purpose of producing a liquid crystal display element with, for example, a PS mode, a transverse electric field-type PSA mode, or a transverse electric field-type PSVA mode. For example, a photopolymerizable monomer whose polymerization proceeds with energy rays such as light can be used as the polymerizable compound. In terms of structure, a polymerizable compound having a liquid crystal skeleton formed by bonding a plurality of six-membered rings, such as a biphenyl derivative or a terphenyl derivative is exemplified. More specifically, the polymerizable compound is preferably a bifunctional monomer represented by general formula (V).

[Chem. 17]

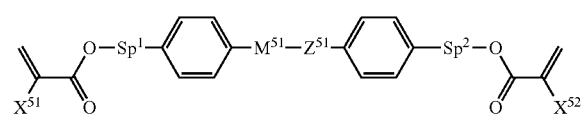

(V)

(In the formula, $X^{51}$ and $X^{52}$ each independently represent a hydrogen atom or a methyl group and $Sp^1$ and $Sp^2$ each independently represent a single bond, an alkylene group having 1 to 8 carbon atoms, or —O—$(CH_2)_s$— (where s represents an integer of 2 to 7 and the oxygen atom bonds to an aromatic ring); $Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; and $M^{51}$ represents a 1,4-phenylene group, a trans-1,4-cyclohexylene group, or a single bond and, in all the 1,4-phenylene groups in the general formula, any of hydrogen atoms may be substituted with fluorine atoms.)

The polymerizable compound is preferably any of a diacrylate derivative in which $X^{51}$ and $X^{52}$ each represent a hydrogen atom and a dimethacrylate derivative in which $X^{51}$ and $X^{52}$ each represent a methyl group, and is also preferably a compound in which one of $X^{51}$ and $X^{52}$ represents a hydrogen atom and the other represents a methyl group. Among these compounds, the diacrylate derivative has the highest rate of polymerization, the dimethacrylate derivative has a low rate of polymerization, and the asymmetrical compound has an intermediate rate of polymerization. A preferred one can be used in accordance with the applications. In a PSA display element, the dimethacrylate derivative is particularly preferably used.

$Sp^1$ and $Sp^2$ each independently represent a single bond, an alkylene group having 1 to 8 carbon atoms, or —O—$(CH_2)_s$—. In a PSA display element, at least one of $Sp^1$ and $Sp^2$ preferably represents a single bond. A compound in which $Sp^1$ and $Sp^2$ each represent a single bond or a compound in which one of $Sp^1$ and $Sp^2$ represents a single bond and the other represents an alkylene group having 1 to 8 carbon atoms or —O—$(CH_2)_s$— is preferred. In this case, an alkyl group having 1 to 4 carbon atoms is preferred and s is preferably 1 to 4.

$Z^{51}$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably represents —COO—, —OCO—, or a single bond, and particularly preferably represents a single bond.

$M^{51}$ represents a 1,4-phenylene group in which any of hydrogen atoms may be substituted with fluorine atoms, a trans-1,4-cyclohexylene group, or a single bond and preferably represents the 1,4-phenylene group or a single bond. When C represents a ring structure other than a single bond, $Z^{51}$ preferably represents a linking group other than a single bond. When $M^{51}$ represents a single bond, $Z^{51}$ preferably represents a single bond.

In view of the foregoing, the ring structure between $Sp^1$ and $Sp^2$ in the general formula (V) is preferably the following structure.

In the case where $M^{51}$ represents a single bond and the ring structure is constituted by two rings in the general formula (V), the ring structure is preferably represented by formula (Va-1) to formula (Va-5) below, more preferably represented by formula (Va-1) to formula (Va-3), and particularly preferably represented by formula (Va-1).

[Chem. 18]

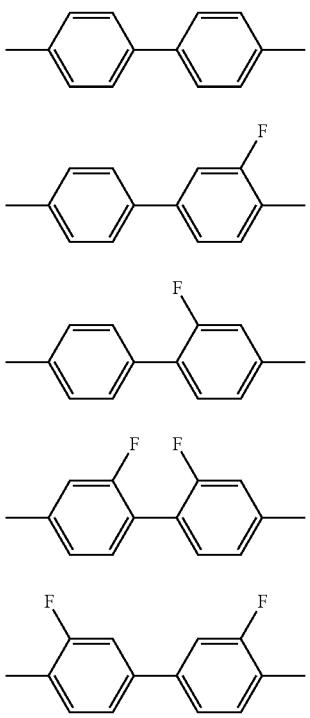

(Va-1)
(Va-2)
(Va-3)
(Va-4)
(Va-5)

(In formulae, both ends bond to Sp¹ and Sp².)

The anchoring strength after the polymerization of the polymerizable compound having such a skeleton is suitable for PSA-type liquid crystal display elements, and a good alignment state is achieved. Therefore, the display unevenness is suppressed or completely prevented.

Accordingly, the polymerizable compound is particularly preferably represented by general formula (V-1) to general formula (V-4) and most preferably represented by general formula (V-2).

[Chem. 19]

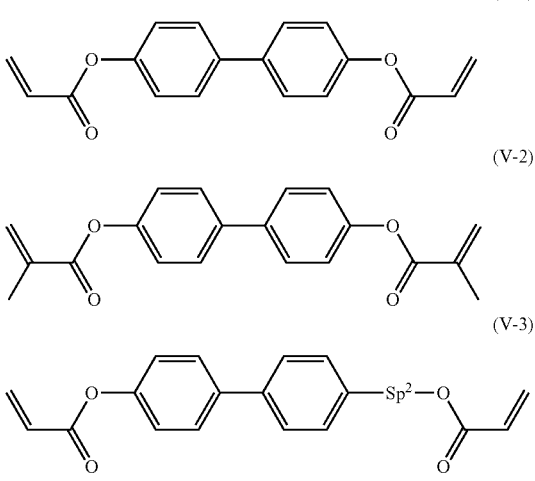

(V-1)
(V-2)
(V-3)

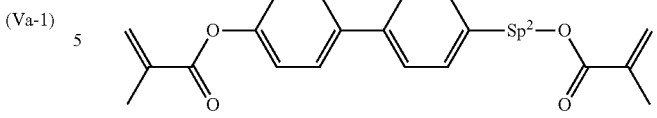

(V-4)

(In the formulae, $Sp^2$ represents an alkylene group having 2 to 5 carbon atoms.)

In the case where the polymerizable compound is added to the liquid crystal composition of the present invention, polymerization proceeds without a polymerization initiator, but a polymerization initiator may be contained to facilitate the polymerization. Examples of the polymerization initiator include benzoin ethers, benzophenones, acetophenones, benzylketals, and acylphosphine oxides.

The liquid crystal composition containing the polymerizable compound in the present invention is provided with liquid crystal alignment capability by polymerizing the polymerizable compound through irradiation with ultraviolet rays and is used for liquid crystal display elements that control the amount of transmitted light by using the birefringence of the liquid crystal composition. The liquid crystal composition is useful for liquid crystal display elements such as an AM-LCD (active matrix liquid crystal display element), a TN (nematic liquid crystal display element), an STN-LCD (super-twisted nematic liquid crystal display element), an OCB-LCD, and an IPS-LCD (in-plane switching liquid crystal display element). The liquid crystal composition is particularly useful for AM-LCDs and can be used for transmission or reflection-type liquid crystal display elements.

(Color Filter)

A color filter according to the present invention contains an organic pigment, and thus absorbs light having a particular wavelength and transmits light having a wavelength other than the particular wavelength.

Any base may be used as long as the base transmits light and may be suitably selected in accordance with the application. The base is made of, for example, resin or an inorganic material and is particularly preferably made of glass.

The color filter includes the base and the organic pigment. The organic pigment may be dispersed in the base or may be present only on the surface of the base. Alternatively, the organic pigment may be dispersed in a resin and the resin may be molded, or the organic pigment may be dispersed in the surface of the base in the form of a coating film. For example, a color filter obtained by coating the surface of a glass base with a pigment dispersion liquid can be suitably used for emission-type display elements such as liquid crystal display elements and organic EL display elements.

The color filter may have any shape such as a plate-like shape, a film-like shape, a lens-like shape, or a spherical shape. The color filter may be a color filter partially including three-dimensional projections and depressions or a color filter obtained by forming fine projections and depressions on the surface thereof.

[Organic Pigment]

Examples of the organic pigment of the present invention include phthalocyanine pigments, insoluble azo pigments, azo lake pigments, anthraquinone pigments, quinacridone pigments, dioxazine pigments, diketopyrrolopyrrole pigments, anthrapyrimidine pigments, anthanthrone pigments, indanthrone pigments, flavanthrone pigments, perinone pigments, perylene pigments, thioindigo pigments, triarylmethane pigments, isoindolinone pigments, isoindoline pigments, metal complex pigments, quinophthalone pigments, and dye lake pigments. The organic pigment may be suitably selected in accordance with the wavelength of light to be transmitted.

In the case of red color filters, red pigments may be used, such as a pigment having high transmittance at a wavelength of 600 nm or more and 700 nm or less. The pigments may be used alone or in combination of two or more. Specific examples of the pigments that can be favorably used include C.I. Pigment Red 81, 122, 177, 209, 242, and 254 and Pigment Violet 19. Among them, C.I. Pigment Red 254 is particularly preferred and the maximum transmission wavelength of C.I. Pigment Red 254 is between 660 nm and 700 nm.

The red color filter may further contain, as a toning pigment, at least one organic pigment selected from the group consisting of C.I. Pigment Orange 38 and 71 and C.I. Pigment Yellow 150, 215, 185, 138, and 139.

In the case of green color filters, green pigments may be used, such as a pigment having a maximum transmission wavelength at a wavelength of 500 nm or more and 600 nm or less. The pigments may be used alone or in combination of two or more. Specific examples of the pigments that can be favorably used include C.I. Pigment Green 7, 36, and 58. Among them, C.I. Pigment Green 58 is particularly preferred and the maximum transmission wavelength of C.I. Pigment Green 58 is between 510 nm and 550 nm.

The green color filter may further contain, as a toning pigment, at least one organic pigment selected from the group consisting of C.I. Pigment Yellow 150, 215, 185, and 138.

In the case of blue color filters, blue pigments may be used, such as a pigment having a maximum transmission wavelength at a wavelength of 400 nm or more and 500 nm or less. The pigments may be used alone or in combination of two or more. Specific examples of the pigments that can be favorably used include C.I. Pigment Blue 15:3 and 15:6, and C.I. Pigment Blue 1 serving as a triarylmethane pigment and/or a triarylmethane pigment represented by general formula (1) below (in the formula, $R^1$ to $R^6$ each independently represent a hydrogen atom, an alkyl group having 1 to 8 carbon atoms that may be substituted, or an aryl group that may be substituted; when $R^1$ to $R^6$ represent an alkyl group that may be substituted, a ring structure may be formed by bonding adjacent $R^1$ and $R^2$, bonding adjacent $R^3$ and $R^4$, and bonding adjacent $R^5$ and $R^6$; $X^1$ and $X^2$ each independently represent a hydrogen atom, a halogen atom, or an alkyl group having 1 to 8 carbon atoms that may be substituted; $Z^-$ represents at least one anion selected from a heteropolyoxometalate anion represented by $(P_2Mo_y W_{18-y}O_{62})^{6-}/6$ where y represents an integer of 0, 1, 2, or 3, a heteropolyoxometalate anion represented by $(SiMoW_{11}O_{40})^{4-}/4$, and a lacunary Dawson phosphotungstic heteropolyoxometalate anion; and, in a case where a single molecule contains a plurality of the formula (1), the plurality of the formula (1) may represent the same structure or different structures).

In the general formula (1), $R^1$ to $R^6$ may be the same or different. Therefore, an —NRR (RR represents any of combinations of $R^1R^2$, $R^3R^4$, and $R^5R^6$) group may be symmetrical or asymmetrical.

The maximum transmission wavelength of C.I. Pigment Blue 15:3 is present between 440 nm and 480 nm. The maximum transmission wavelength of C.I. Pigment Blue 15:6 is present between 430 nm and 470 nm. The maximum transmission wavelength of the triarylmethane pigment is present between 410 nm and 450 nm.

The blue color filter may further contain, as a toning pigment, at least one organic pigment selected from the group consisting of C.I. Pigment Violet 23 and 37 and C.I. Pigment Blue 15, 15:1, 15:2, and 15:4.

[Chem. 20]

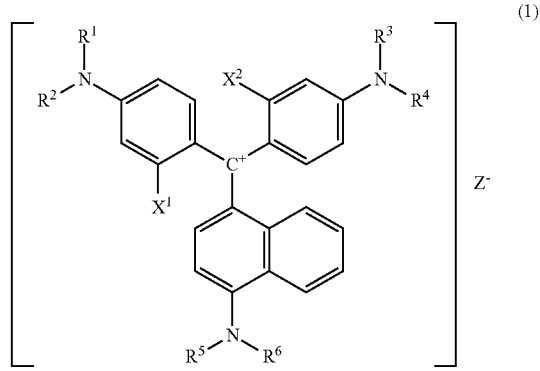

In the case where the color filter can be produced by a method in which a pigment dispersion body containing the organic pigment is applied onto a base, the pigment dispersion body may contain a publicly known pigment dispersing agent, a solvent, or the like in addition to the organic pigment. A dispersion liquid is prepared by dispersing the organic pigment using a solvent or a pigment dispersing agent, and the resulting dispersion liquid may be applied onto a base by, for example, a spin coating method, a roll coating method, an ink jet method, a spray coating method, or a printing method.

The organic pigment may be applied onto a base and dried to produce a color filter. In the case where the pigment dispersion body contains a curable resin, curing may be performed using heat or active energy rays to produce a color filter. Furthermore, a step of removing volatile components in a film may be performed by performing a heat treatment (post-baking) at 100° C. to 280° C. for a predetermined time using a heating apparatus such as a hot plate or an oven.

[State of Pigment Particles in Color Filter]

In the color filter of the present invention, the volume fraction of organic pigment particles having a size of more than 1000 nm is 1% or less, and the volume fraction of organic pigment particles having a size of 40 nm or more and 1000 nm or less is 25% or less. In the color filter, the state of an organic pigment in the form of a color filter makes the highest contribution to suppressing display defects such as white streaks, variations in alignment, and image sticking. By specifying the organic pigment particles in the form of a color filter, a color filter that prevents the display defects is obtained.

The particles having a size of 40 nm or more and 1000 nm or less are higher-order particles, such as secondary particles, tertiary particles, and quaternary particles, formed as a result of aggregation of primary particles. The volume fraction of the particles having a size of 40 nm or more and 1000 nm or less is preferably 15% or less.

A large amount of particles having a size of 100 nm or more and 1000 nm or less affects the display state. The volume fraction of the particles having a size of 100 nm or more and 1000 nm or less is preferably 7% or less and more preferably 3% or less.

In the organic pigment, coarse particles having a size of more than 1000 nm are not preferred because they adversely affect the display state. Therefore, the volume fraction of such coarse particles needs to be 1% or less. The surface of the color filter may be observed with an appropriate optical microscope or the like.

[Ultra-Small Angle X-Ray Scattering Profile]

The volume fraction of particles having a size of 1000 nm or less can be measured by analyzing an ultra-small angle X-ray scattering profile based on ultra-small angle X-ray scattering.

Specifically, this measurement method includes a step (A) of measuring an ultra-small angle X-ray scattering profile (measured scattering profile) of an organic pigment on the basis of ultra-small angle X-ray scattering, a step (B) of determining a theoretical scattering profile by simulation from a hypothetical radius $R_1$ and a hypothetical normalized variance, where the organic pigment is assumed to be constituted by spherical particles with a radius R that have a variation in particle size distribution, a step (C) of determining a residual sum of squares z between the theoretical scattering profile and the measured scattering profile by performing curve fitting on the theoretical scattering profile and the measured scattering profile, and a step (D) of repeatedly performing the step (B) and the step (C) n times by setting a plurality of particle size distribution models each including another radius $R_{n+1}$ (n: integer, $R_n < R_{n+1}$) and the corresponding hypothetical normalized variance until the residual sum of squares Z determined in the step (C) reaches 2% or less and determining at least one of average particle sizes, normalized variances, and volume fractions of primary particles and higher-order particles of an organic pigment from the results of the curve fitting of the theoretical scattering profile and the measured scattering profile.

Ultra-small angle X-ray scattering (USAXS) is a method for measuring not only scattering in a small-angle region in which the scattering angle is $0.1 < (2\theta) < 10?$, but also diffuse scattering and diffraction that occur in an ultra-small-angle region in which the scattering angle is $0° < (2\theta) \leq 0.1°$. In small angle X-ray scattering, when regions having different electron densities with a size of about 1 nm to 100 nm are present in a substance, the diffuse scattering of X-rays can be measured due to the difference in electron density. On the other hand, in ultra-small angle X-ray scattering, when regions having different electron densities with a size of about 1 nm to 1000 nm are present in a substance, the diffuse scattering of X-rays is measured due to the difference in electron density. The particle size of particles to be measured is determined based on the scattering angle and the scattering intensity.

The main technology for achieving the ultra-small angle X-ray scattering includes two techniques: an advanced optical controlling technique that reduces the background scattering intensity in an ultra-small-angle region by decreasing the wavelength width of incident X-rays or the beam diameter and a technique that precisely measures a portion with a small scattering angle by increasing the distance from a sample to a detector as much as possible, that is, increasing the camera length. A laboratory-scale small-size apparatus uses mainly the former technique.

A program for determining the particle size distribution from a small angle X-ray scattering curve is preferably, for example, NANO-solver (manufactured by Rigaku Corporation) or GIFT (manufactured by PANalytical).

In the case where the particle size of the organic pigment is measured, when the brightness of incident X-rays in an X-ray scattering instrument is $10^6$ brilliance (photons/sec/$mm^2/mrad^2/0.1\%$ bandwidth) or more, a sufficient scattering intensity can be measured and the brightness is preferably $10^7$ brilliance or more. When a substrate of a coating film is made of glass or the like, such a substrate easily absorbs X-rays and thus the brightness of incident X-rays considerably decreases. Therefore, the brightness of incident X-rays is preferably $10^{16}$ brilliance or more and more preferably $10^{18}$ brilliance or more in order to precisely measure the average particle sizes, normalized variances, and volume fractions of primary particles and higher-order particles of the organic pigment.

A light source available in a large synchrotron radiation facility such as SPring-8 in Hyogo Prefecture or Photon Factory in Ibaraki Prefecture can be used as a high-brightness X-ray source with $10^{16}$ brilliance or more. In such a facility, a desired scattering region can be set by selecting an appropriate camera length. Furthermore, optimum measurement conditions can be selected to achieve a wide range of purposes such as sufficient scattering intensity, prevention of sample damage, and protection of a detector. That is, an absorption plate made of several metals, which is called an attenuator, is used on the incident side or the exposure time is freely adjusted to be in the range of about 0.5 to 60 seconds. The attenuator is, for example, a thin film made of Au, Ag, or molybdenum.

The specific procedure of the measurement will be described below. In the step (A), a color filter is set on a sample holder, a sample stage, or the like of a commercially available X-ray diffraction apparatus. Then, the scattering intensities I at scattering angles (2θ), which are in the range of less than 10°, are measured to measure the small angle X-ray scattering profile (measured scattering profile).

In an ultra-small angle scattering apparatus that uses synchrotron radiation and is used when the substrate is a glass substrate, white light taken from a circular accelerator called a storage ring is converted into monochromatic light with a double crystal monochromator. Light with a wavelength (e.g., 1 Å) in an X-ray region is used as a radiation source. The light is made to enter a coating film disposed on the sample state and a two-dimensional detector is exposed with the scattered light for a certain time. The scattering profile obtained in the form of a concentric circle is one-dimensionally averaged and converted into scattering intensities I at scattering angles (2θ), which are in the range of less than 10°, to obtain a small angle X-ray scattering profile (measured scattering profile). The above-described process is the step (A).

In the step (B), the organic pigment is assumed to be constituted by spherical particles with a radius R that have a variation in particle size distribution from the measured scattering profile. A theoretical scattering profile is determined by simulation using commercially available analysis software from a hypothetical radius $R_1$ and a hypothetical normalized variance.

In general, when an electron density difference region with $\Delta\rho(r)$ is present in a substance, the scattering intensity I can be approximated as in formula (1) below.

[Math. 1]

$$I(q) = \left(\int_V \Delta\rho(r)e^{iq\cdot r}dr\right)^* \int_V \Delta\rho(r)e^{iq\cdot r}dr = |F(q)|^2 S(q) \quad (1)$$

In the formula (1), q represents a scattering vector and V represents a region of a volume integral, which means that an integral is performed on the entire substance. F(q) represents a form factor and S(q) represents a structure factor. When particles are randomly present in a substance, S(q)=1. The scattering vector q is represented by formula (2) below.

[Math. 2]

$$q = \frac{4\pi}{\lambda}\sin\frac{2\theta}{2} \quad (2)$$

In the formula (2), γ represents a wavelength of an X-ray and 2θ represents a scattering angle. When the particles are spherical particles having a radius R in the formula (1), the form factor F(q) is represented by formula (3) below.

[Math. 3]

$$F(q) = \Delta\rho \int_0^{2\pi} d\varphi \int_0^{\pi} d\theta \int_0^R e^{iqr\cos\theta} r^2 \sin\theta dr = \Delta\rho \frac{4\pi}{q^3}(\sin(qR) - qR\cos(qR)) \quad (3)$$

Accordingly, if the form factor F(q) is calculated by assuming the hypothetical radius R, the scattering intensity I can be determined from the formulae (1), (2), and (3). However, the scattering intensity I is calculated on the assumption that the particles in the substance each have the same size (the same radius R). In an actual substance, particles each having the same size are rarely present, and particles generally have a certain degree of variation (variation in particle size distribution). Furthermore, an object of the present invention is to accurately and precisely measure the particle size distribution of an organic pigment having such a variation in particle size distribution. Therefore, the assumption that the particle size distribution varies is inevitably required.

When there is such a variation in particle size distribution, the scattering intensity I is given by superimposing the scattering caused by each of particles having various sizes. The distribution function used to assume the variation in particle size distribution may be a publicly known distribution function used in statistics, but is preferably a Γ distribution function in consideration of the variation in particle size distribution in an actual substance. The Γ distribution function is represented by formula (4) below.

[Math. 4]

$$P_{R_0}^M(R) = \frac{1}{\Gamma(M)}\left(\frac{M}{R_0}\right)^M e^{\frac{M\cdot R}{R_0}} R^{-1+M} \quad (4)$$

In the formula, $R_0$ represents an average radius of spherical particles and M represents a broadening parameter of the particle size distribution. Assuming that the particle size distribution in the substance is given by the Γ distribution function and the scattering intensity I is given by superimposing the scattering caused by each of particles having various radii $R_1$ (average radius: $R_0$), the scattering intensity I in the case where there is a variation in particle size distribution is represented by formula (5) below using the above formulae (3) and (4).

[Math. 5]

$$I(q, R_0, M) = \int_0^{\infty} |F(q, R)|^2 P_{R_0}^M(R) \frac{1}{R^3} dR \quad (5)$$

M, which is a broadening parameter of the particle size distribution in the formula (5), is output as a normalized variance σ (%) as a result of the conversion in formula (6).

[Math. 6]

$$\sigma(\%) = \frac{1}{\sqrt{M}} \times 100 \quad (6)$$

In the step (B), the scattering intensity I at a scattering angle (2θ) is calculated by simulation from a hypothetical radius $R_1$ and a hypothetical normalized variance using the formula (5) to determine a theoretical scattering profile.

In the step (C), curve fitting is performed by the least-squares method on the theoretical scattering profile calculated from the scattering intensity I and the measured scattering profile.

Variables that are refined in the profile fitting are an average particle size (nm) and a normalized variance (%). The profile fitting is performed by the least-squares method so that the residual sum of squares Z between the theoretical scattering profile and the measured scattering profile is minimized. The smaller the residual sum of squares Z is, the higher the precision of the particle size analysis is. In general, when Z decreases to be less than 2%, both the profiles substantially overlap one another, which may be judged as convergence. Z is preferably less than 1% and more preferably less than 0.5%. The average primary particle size and the normalized variance, which are variables upon convergence are obtained as analysis results.

If X-ray scattering is measured in a region including an ultra-small angle scattering region in the step (A), even a relatively large particle size is within the analysis range. Therefore, in the fitting analysis performed in the step (C) that uses the single particle size distribution, that is, the single average primary particle size and the normalized variance assumed in the step (B), the residual sum of squares Z does not sufficiently decrease and thus the measured profile sometimes does not satisfactorily match the theoretical scattering profile.

This is assumed to be because the particle size distribution is not a single particle size distribution and pigment particles having larger particle sizes and higher-order aggregated particles are contained so as to form a plurality of particle size distributions. Thus, another particle size distribution model is introduced.

In the step (D), the step (B) and the step (C) are repeatedly performed n times by setting a plurality of particle size distribution models including another radius $R_{n+1}$ (n: integer, $R_n < R_{n+1}$) and the corresponding hypothetical normalized variance until the residual sum of squares Z determined in the step (C) reaches 2% or less.

Specifically, another particle size distribution model with a larger average particle size is assumed. In the model, the radius is assumed to be $R_2$ ($R_2 > R_1$). When the scattering intensities I of the components are assumed to be I(1) and I(2), the left term of the formula (5) representing the scattering intensity is corrected as in formulae (7) and (8).

[Math. 7]

$$I(1) = I(q, R_1, M_1) = \int_0^\infty |F(q, R)|^2 P_{R_1}^{M_1}(R) \frac{1}{R^3} dR \qquad (7)$$

where $M_1$ is a broadening parameter of a first particle size distribution.

[Math. 8]

$$I(2) = I(q, R_2, M_2) = \int_0^\infty |F(q, R)|^2 P_{R_2}^{M_2}(R) \frac{1}{R^3} dR \qquad (8)$$

where $M_2$ is a broadening parameter of a second particle size distribution.

Similarly, even when a third radius $R_3$ and distributions with larger radii are assumed, the scattering intensities I can be described as I(3), I(4), . . . , I(n).

The total scattering intensity $I_{Total}$ of particle size distribution models with two average particle sizes is represented by formula (9).

$$I_{Total} = k(1)I(1) + k(2)I(2) \qquad (9)$$

In the formula, k(1) and k(2) are scale factors that represent a composition ratio of the components.

Similarly, when particle size distribution models with three or more average particle sizes are assumed, the total scattering intensity of n particle size distribution models in total can be represented by formula (10).

$$I_{Total} = k(1)I(1) + k(2)I(2) + \ldots + k(n)I(n) \qquad (10)$$

In the plurality of particle size distributions, for example, the volume fractions w(1), w(2) . . . w(n) of n particle size distribution components are represented by a ratio in formula (11).

$$w(1):w(2): \ldots :w(n) = k(1):k(2): \ldots :k(n) \qquad (11)$$

Variables that are refined in the profile fitting are an average particle size (nm) of each particle size distribution component, a normalized variance (%) that represents the width of each particle size distribution, and a volume fraction (%) of each component. The profile fitting is performed so that the residual sum of squares Z between the measured profile and the total theoretical scattering profile is minimized. Thus, the variables are determined.

When the profile fitting in the step (D) does not satisfactorily converge, that is, when the minimum of the residual sum of squares Z is not determined, such a cause may be an excessively large number of variables to be determined. In this case, the normalized variance of each particle size distribution component may be fixed with reference to the normalized variance determined in the step (C). As a result, profile fitting performed by the least-squares method using a smaller number of variables easily converge. Thus, the average particle size of each particle size distribution component, the normalized variance (%), and the volume fraction (%) of each component are obtained as analysis results.

(Alignment Film)

In the liquid crystal display device of the present invention, when an alignment film for aligning a liquid crystal composition needs to be formed on surfaces of first and second substrates that contact the liquid crystal composition, the alignment film is disposed between a color filter and a liquid crystal layer. However, the thickness of the alignment film is at most 100 nm or less, which does not completely block the interaction between a coloring agent such as a pigment constituting the color filter and a liquid crystal compound constituting the liquid crystal layer.

In a liquid crystal display device that does not use an alignment film, higher interaction occurs between a coloring agent such as a pigment constituting the color filter and a liquid crystal compound constituting the liquid crystal layer.

The alignment film can be composed of a transparent organic material such as polyimide, polyamide, BCB (benzocyclobutene polymer), or polyvinyl alcohol. In particular, the alignment film is preferably a polyimide alignment film formed by imidizing polyamic acid synthesized from a diamine such as an aliphatic or alicyclic diamine, e.g., p-phenylene diamine or 4,4'-diaminodiphenylmethane, an aliphatic or alicyclic tetracarboxylic acid anhydride such as butanetetracarboxylic acid anhydride or 2,3,5-tricarboxycyclopentylacetic acid anhydride, and an aromatic tetracarboxylic acid anhydride such as pyromellitic acid dianhydride. In this case, the alignment is generally provided by rubbing, but the alignment film can be used without providing alignment when used as a vertical alignment film or the like.

The alignment film can be composed of a material containing chalcone, cinnamate, cinnamoyl, or an azo group in a compound, and such a material may be used in combination with a material such as polyimide and polyamide. In this case, rubbing or an optical alignment technique may be used for the alignment film.

In the alignment film, a resin film is generally formed by applying the alignment film material onto a substrate by a method such as a spin coating method. A uniaxially stretching method, a Langmuir-Blodgett method, or the like can also be employed.

(Transparent Electrode)

In the liquid crystal display device of the present invention, the transparent electrode can be composed of a material such as a conductive metal oxide. The metal oxide can be indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-added titanium dioxide ($Ti_{1-x}Nb_xO_2$), fluorine-doped tin oxide, graphene nanoribbon, or metal nanowire and is preferably zinc oxide (ZnO), indium tin oxide ($In_2O_3$—$SnO_2$), or indium zinc oxide ($In_2O_3$—ZnO). The transparent conductive film can be patterned by, for example, a photo-etching method or a method that uses a mask.

The liquid crystal display device of the present invention is particularly useful for active matrix driving liquid crystal display devices and can be applied to liquid crystal display devices with a TN mode, an IPS mode, a polymer-stabilized IPS mode, an FFS mode, an OCB mode, a VA mode, or an ECB mode.

By combining a backlight, the liquid crystal display device is used in various applications such as monitors of liquid crystal televisions and personal computers, displays of cellular phones and smart phones, notebook computers, mobile information terminals, and digital signage. Examples of the backlight include a cold-cathode tube backlight, and a pseudo-white backlight with two wavelength peaks and a backlight with three wavelength peaks that use a light-emitting diode composed of an inorganic material or an organic EL element.

EXAMPLES

The present invention will now be further described in detail on the basis of Examples, but the present invention is not limited to Examples. In compositions of Examples and Comparative Examples below, "%" means "% by mass".

In Examples, the measured properties are as follows.

$T_{ni}$: nematic phase-isotropic liquid phase transition temperature (° C.)

Δn: refractive index anisotropy at 25° C.

Δ∈: dielectric anisotropy at 25° C.

η: viscosity (mPa·s) at 20° C.

γ1: rotational viscosity (mPa·s) at 25° C.

VHR: voltage holding ratio (%) at 70° C.

(a value, which is expressed as a percentage, of the ratio of a measured voltage to an initial voltage, the measured voltage being obtained by injecting a liquid crystal composition into a cell having a thickness of 3.5 μm and performing measurement at an application voltage of 5 V, a frame time of 200 ms, and a pulse duration of 64 μs)

ID: ion density (pC/cm²) at 70° C.

(an ion density obtained by injecting a liquid crystal composition into a cell having a thickness of 3.5 μm and performing measurement at an application voltage of 20 V and a frequency of 0.05 Hz using MTR-1 (manufactured by TOYO Corporation))

Image Sticking:

Image sticking of a liquid crystal display element was evaluated as follows. A predetermined fixed pattern was displayed in a display area for 1000 hours, and a uniform image was then displayed on the full screen. The level of a residual image of the fixed pattern was evaluated through visual inspection on the basis of the four-level criteria described below.

A: No residual image was observed.

B: A residual image was slightly observed, but was at an acceptable level.

C: A residual image was observed, and was at an unacceptable level.

D: A residual image was observed, and was at a very poor level.

In Examples, the following abbreviations are used for the description of compounds.

(Ring Structure)

[Chem. 21]

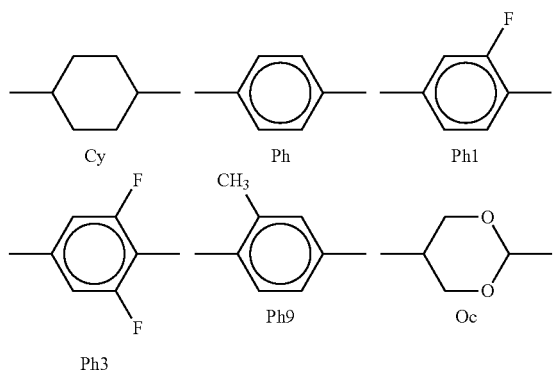

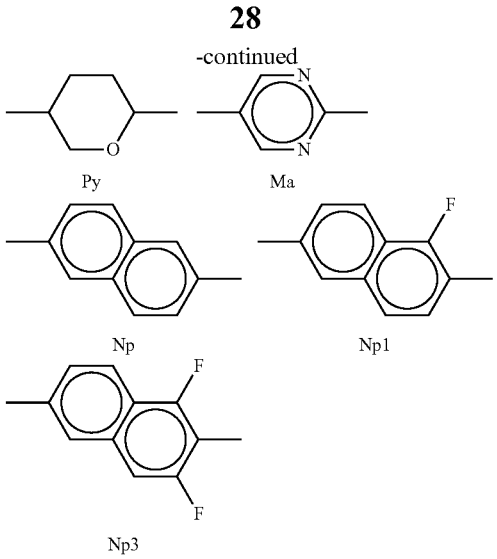

(Side Chain Structure and Linking Structure)

TABLE 1

| n (number) at terminal | $C_nH_{2n+1}$— |
|---|---|
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |
| —F | —F |
| —Cl | —Cl |
| —CN | —C≡N |
| —OCFFF | —$OCF_3$ |
| —CFFF | —$CF_3$ |
| —On | —$OC_nH_{2n+1}$— |
| -T- | —C≡C— |
| —N— | —CH=N—N=CH— |
| ndm- | $C_nH_{2n+1}$—HC=CH—$(CH_2)_{m-1}$— |
| -ndm | —$(CH_2)_{n-1}$—HC=CH—$C_mH_{2m+1}$ |
| ndmO— | $C_nH_{2n+1}$—HC=CH—$(CH_2)_{m-1}$O— |
| —Ondm | —O—$(CH_2)_{n-1}$—HC=CH—$C_mH_{2m+1}$ |
| -ndm- | —$(CH_2)_{n-1}$—HC=CH—$(CH_2)_{m-1}$— |

[Production of Color Filter]

[Production of Pigment Dispersion Liquid]

Synthetic Example 1

Synthesis of Copolymer a

A mixture containing 68 parts of ethyl methacrylate, 29 parts of 2-ethylhexyl methacrylate, 3 parts of thioglycolic acid, and 0.2 parts of a polymerization initiator ("Perbutyl (registered trademark) O" [active component: t-butyl peroxy-2-ethylhexanoate manufactured by NOF CORPORATION]) was added dropwise to 100 parts of xylene, which was kept in a nitrogen stream at 80° C., under stirring for four hours. After the completion of the addition, 0.5 parts of "Perbutyl (registered trademark) O" was added every four hours and the mixture was stirred at 80° C. for 12 hours. After the completion of the reaction, xylene was added to control the non-volatile content. Thus, a xylene solution of a copolymer a having a non-volatile content of 50% was prepared.

Synthetic Example 2

Synthesis of Copolymer b

A mixture containing 66 parts of ethyl methacrylate, 28 parts of 2-ethylhexyl methacrylate, 6 parts of thioglycolic acid, and 0.3 parts of a polymerization initiator ("Perbutyl (registered trademark) O" [active component: t-butyl peroxy-2-ethylhexanoate manufactured by NOF CORPORATION]) was added dropwise to 100 parts of xylene, which was kept in a nitrogen stream at 80° C., under stirring for four hours. After the completion of the addition, 0.5 parts of "Perbutyl (registered trademark) O" was added every four hours and the mixture was stirred at 80° C. for 12 hours. After the completion of the reaction, an appropriate amount of xylene was added to control the non-volatile content. Thus, a xylene solution of a copolymer b having a non-volatile content of 50% was prepared.

Synthetic Example 3

Synthesis of Polymer A

A mixture containing 54.5 parts of xylene, 19.0 parts of the copolymer a obtained in Synthetic Example 2, 38.0 parts of the copolymer b, and 7.5 parts of a 20% aqueous polyallylamine solution ("PAA-05" manufactured by Nitto Boseki Co., Ltd., number-average molecular weight: about 5000) was charged into a flask equipped with a stirrer, a reflux condenser, a nitrogen blowing tube, and a thermometer. The reaction was caused to proceed under stirring in a nitrogen stream at 140° C. for eight hours while water was distilled off using a separator and xylene was refluxed to a reaction solution.

After the completion of the reaction, an appropriate amount of xylene was added to control the non-volatile content. Thus, a polymer A, which was a modified polyamine, having a non-volatile content of 40% was prepared. The weight-average molecular weight of the resin was 10000 and the amine value was 22.0 mgKOH/g.

Production Example 1

Production of Powdery Pigment 1

FASTOGEN Green A110 (C.I. Pigment Green 58, brominated/chlorinated zinc phthalocyanine) manufactured by DIC Corporation was used as a powdery pigment 1.

Production Example 2

Production of Powdery Pigment 2

After 100 parts of the powdery pigment 1 obtained in Production Example 1, 300 parts of heptane, and 10 parts of the polymer A were mixed, 300 parts of 1.25 mm zirconia beads were added to the mixture. The mixture was stirred with a paint shaker (manufactured by Toyo Seiki Seisaku-Sho, Ltd.) at ordinary temperature for one hour. Then, the mixture was diluted with 200 parts of heptane and filtered to remove the zirconia beads. Thus, a pigment mixture solution was obtained.

After 400 parts of the obtained pigment mixture solution was charged into a separable flask equipped with a thermometer, a stirrer, a reflux condenser, and a nitrogen gas inlet tube, a material obtained by dissolving 2 parts of 2,2'-azobis(2-methylbutyronitrile) in a polymerizable monomer composition containing 5 parts of methyl methacrylate and 5 parts of ethylene glycol dimethacrylate was added to the separable flask. Stirring was performed at room temperature for 30 minutes, and then the temperature was increased to 80° C. The reaction was continued at 80° C. for 15 hours. After the temperature was decreased, filtration was performed to obtain a wet cake. The wet cake was dried with a hot-air drier at 100° C. for five hours and then crushed with a crusher to obtain a powdery pigment 2.

Production Example 3

Production of Powdery Pigment 3

With a double-arm kneader, 10 parts of the powdery pigment 1, 100 parts of pulverized sodium chloride, and 10 parts of diethylene glycol were kneaded at 100° C. for eight hours. After the kneading, 1000 parts of water at 80° C. was added thereto and stirring was performed for one hour. The resulting product was filtered, washed with hot water, dried, and crushed to obtain a powdery pigment 3.

Production Example 4

Production of Dispersion Liquid 1

After 5 parts of the powdery pigment 1 obtained in Production Example 1, 33.3 parts of propylene glycol monomethyl ether (PGMA), and 3 parts of the polymer A were mixed, 65 parts of 0.5 mm Sepr beads were added thereto. The mixture was stirred with a paint shaker (manufactured by Toyo Seiki Seisaku-Sho, Ltd.) for four hours. The resulting mixture solution was filtered to remove the Sepr beads. Thus, a dispersion liquid 1 was obtained.

Production Example 5

Production of Dispersion Liquid 2

A dispersion liquid 2 was obtained in the same manner as in Production Example 4, except that the powdery pigment 1 was changed to the powdery pigment 2 and the polymer A was changed to BYK 6919 (manufactured by BYK-Chemie Japan KK).

Production Example 6

Production of Dispersion Liquid 3

A dispersion liquid 3 was obtained in the same manner as in Production Example 5, except that 0.1 parts of pyridine was further added to 5 parts of the powdery pigment 2, 33.3 parts of PGMA, and 3 parts of BYK 6919.

Production Example 7

Production of Dispersion Liquid 4

A dispersion liquid 4 was obtained in the same manner as in Production Example 6, except that pyridine was changed to morpholine.

Production Example 8

Production of Dispersion Liquid 5

A dispersion liquid 5 was obtained in the same manner as in Production Example 6, except that pyridine was changed to piperidine.

Production Example 9

Production of Powdery Pigment 4 and Dispersion Liquid 6

An ∈-type copper phthalocyanine pigment ("FASTOGEN Blue EP-193" manufactured by DIC Corporation) was used as a powdery pigment 4. After 5 parts of the powdery pigment 4, 33.3 parts of propylene glycol monomethyl ether (PGMA), and 3 parts of the polymer A were mixed, 65 parts of 0.5 mm Sepr beads were added thereto. The mixture was stirred with a paint shaker (manufactured by Toyo Seiki Seisaku-Sho, Ltd.) for four hours. The resulting mixture solution was filtered to remove the Sepr beads. Thus, a dispersion liquid 6 was obtained.

Production Example 10

Production of Powdery Pigment 5 and Dispersion Liquid 8

A diketopyrrolopyrrole red pigment PR254 ("Irgaphor Red B-CF"; R-1 manufactured by Ciba Specialty Chemicals) was used as a powdery pigment 5. After 5 parts of the powdery pigment 5, 33.3 parts of propylene glycol monomethyl ether (PGMA), and 3 parts of the polymer A were mixed, 65 parts of 0.5 mm Sepr beads were added thereto. The mixture was stirred with a paint shaker (manufactured by Toyo Seiki Seisaku-Sho, Ltd.) for four hours. The resulting mixture solution was filtered to remove the Sepr beads. Thus, a dispersion liquid 8 was obtained.

[Production of Color Filter]

Production Example 11

Production of Color Filter 1

Figure 3:
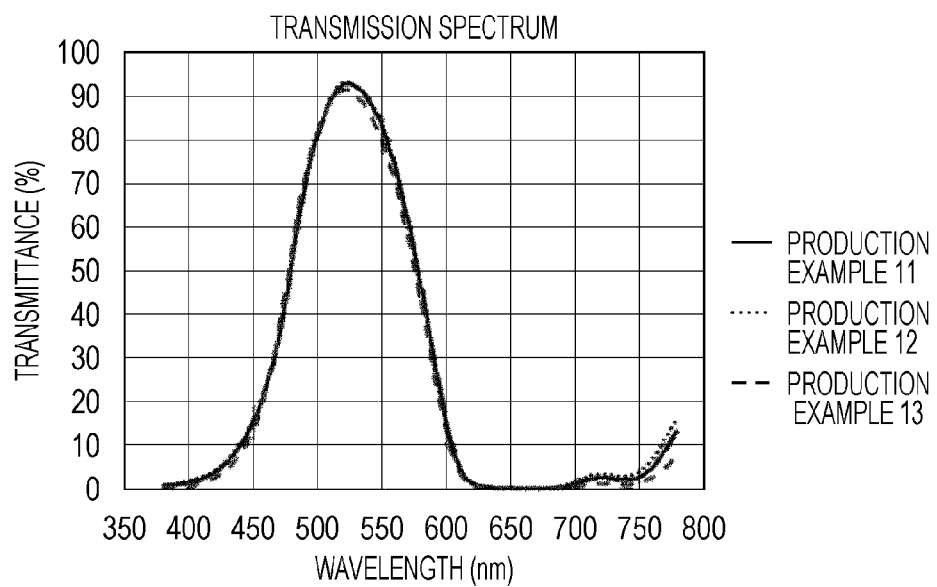
FIG. 3 shows transmission spectra of color filters.

A cover glass (borosilicate cover glass manufactured by TGK) was set in a spin coater (Opticoat MS-A100 manufactured by MIKASA CO., LTD.). The dispersion liquid 1 obtained in Production Example 4 was applied to the cover glass in an amount of 1.5 ml and spin coating was performed at 600 rpm. The resulting coating film was dried in a thermostat at 90° C. for three minutes and then heat-treated at 230° C. for three hours to obtain a color filter 1. The maximum transmission wavelength of the color filter 1 was 523 nm. FIG. 3 shows the transmission spectrum.

Production Example 12

Production of Color Filter 2

A color filter 2 was obtained in the same manner as in Production Example 11, except that the dispersion liquid 1 was changed to the dispersion liquid 2. The maximum transmission wavelength of the color filter 2 was 522 nm. FIG. 3 shows the transmission spectrum.

Production Example 13

Production of Color Filter 3

A color filter 3 was obtained in the same manner as in Production Example 11, except that the dispersion liquid 1 was changed to the dispersion liquid 3. The maximum transmission wavelength of the color filter 3 was 521 nm. FIG. 3 shows the transmission spectrum.

Production Example 14

Production of Color Filter 4

Figure 4:
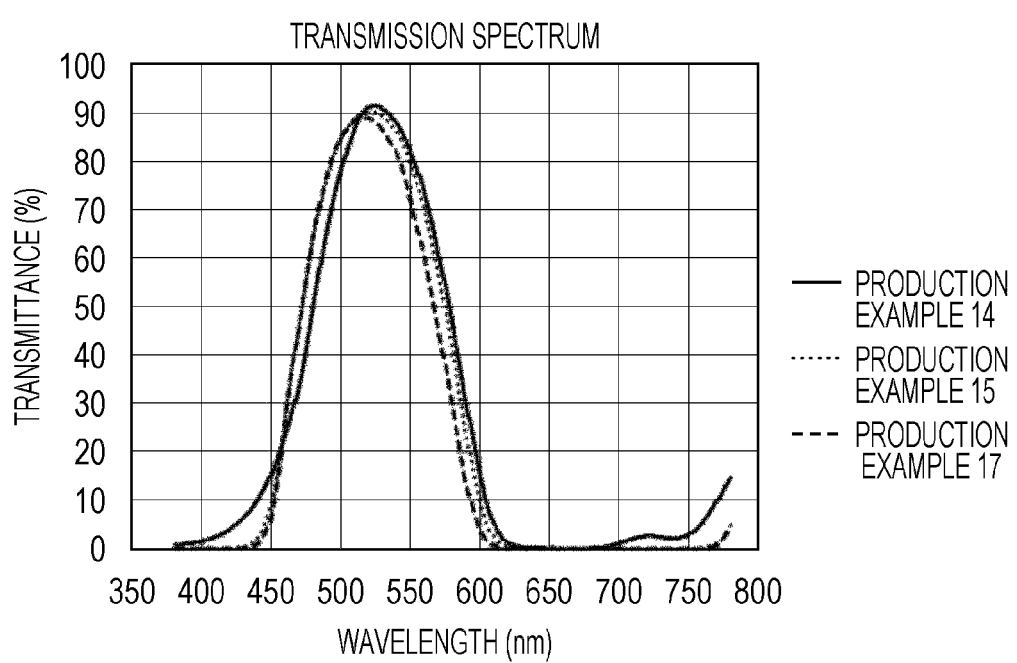
FIG. 4 shows transmission spectra of color filters.

A color filter 4 was obtained in the same manner as in Production Example 11, except that the dispersion liquid 1 was changed to the dispersion liquid 4. The maximum transmission wavelength of the color filter 4 was 523 nm. FIG. 4 shows the transmission spectrum.

Production Example 15

Production of Color Filter 5

A cover glass (borosilicate cover glass manufactured by TGK) was set in a spin coater (Opticoat MS-A100 manufactured by MIKASA CO., LTD.). The dispersion liquid 4 obtained in Production Example 7 was applied to the cover glass in an amount of 1.5 ml and spin coating was performed at 600 rpm. The resulting coating film was dried in a thermostat at 90° C. for three minutes to obtain a color filter 5. The maximum transmission wavelength of the color filter 5 was 521 nm. FIG. 4 shows the transmission spectrum.

Production Example 16

Production of Color Filter 6

A color filter 6 was obtained in the same manner as in Production Example 11, except that the dispersion liquid 1 was changed to the dispersion liquid 5.

Production Example 17

Production of Color Filter 7

A color filter 7 was obtained in the same manner as in Production Example 15, except that the dispersion liquid 4 was changed to the dispersion liquid 3. The maximum transmission wavelength of the color filter 7 was 515 nm. FIG. 4 shows the transmission spectrum.

Production Example 18

Production of Color Filter 8

A color filter 8 was obtained in the same manner as in Production Example 11, except that the dispersion liquid 1 was changed to the dispersion liquid 6. The maximum transmission wavelength of the color filter 8 was 435 nm.

Production Example 19

Production of Color Filter 9

A color filter 9 was obtained in the same manner as in Production Example 11, except that the dispersion liquid 1 was changed to a dispersion liquid 7 which was obtained by changing the powdery pigment 2 of Production Example 6 to the powdery pigment 4 of Production Example 9. The maximum transmission wavelength of the color filter 9 was 435 nm.

Production Example 20

Production of Color Filter 10

A color filter 10 was obtained in the same manner as in Production Example 11, except that the dispersion liquid 1 was changed to the dispersion liquid 8.

Production Example 21

Production of Color Filter 11

A color filter 11 was obtained in the same manner as in Production Example 11, except that the dispersion liquid 1 was changed to a dispersion liquid 9 which was obtained by changing the powdery pigment 2 of Production Example 6 to the powdery pigment 5 of Production Example 11.
[Measurement of Organic Pigment Volume Fraction in Color Filter]
(Measurement of Coarse Particles with Microscope)

The obtained color filters 1 to 11 were observed at freely selected five points with an optical microscope Optiphot2 manufactured by NIKON CORPORATION at a magnification of 2000 times. In any of the color filters 1 to 11, coarse particles with a size of 1000 nm or more were not observed.
(Measurement of Color Filters 1 to 11 with USAXS)

Each of the color filters 1 to 11 was attached to an Al sample holder with a tape and set in a sample stage for transmission. Ultra-small angle X-ray scattering was measured under the conditions below. As a result of analysis, three particle size distributions were obtained. Particles having an average particle size of 1 to 40 nm were expressed as primary particles. Particles having an average particle size of 40 to 100 nm were expressed as secondary particles. Particles having an average particle size of 100 to 1000 nm were expressed as tertiary particles. Table 2 shows these particles. Table 2 also shows higher-order particles, which are the sum of the secondary particles and the tertiary particles.

The measurement instrument and the measurement method are as follows.

Measurement apparatus: Frontier Softmaterial Beamline BL03XU Second Hatch in a large synchrotron radiation facility SPring-8

Measurement mode: Ultra-small angle X-ray scattering (USAXS)

Measurement conditions: wavelength 0.1 nm, camera length 6 m, beam spot size 140 μm×80 μm, no attenuator, exposure time 30 seconds, 2θ=0.01 to 1.5°

Analysis software: The imaging of two-dimensional data and the conversion of two-dimensional data into one-dimensional data were performed with Fit2D (available from a web site [http://www.esrf.eu/computing/scientific/FIT2D/] of European Synchrotron Radiation Facility).

The analysis of the particle size distribution was performed with Software NANO-Solver (ver. 3.6) manufactured by Rigaku Corporation. The details of the analysis are as follows.

In the case where the scatterer model is "sphere", the measurement method is "transmission method", and a green pigment A110 is used, the particles are set to be $C_{32}N_8ZnBr_{16}$ (density: 3.2) and the matrix is set to be $C_6H_{12}O_3$ (density: 1).

Z: Z is 10% or less when only primary particles are calculated; 5% or less when up to secondary particles are set and calculated; and 0.5% or less when up to tertiary particles are set and calculated.

TABLE 2

| Color filter No. | Primary particles | | | Secondary particles | | | Tertiary particles | | | Sum of higher-order particles (%) |
|---|---|---|---|---|---|---|---|---|---|---|
| | Particle size (nm) | Normalized variance (%) | Volume fraction (%) | Particle size (nm) | Normalized variance (%) | Volume fraction (%) | Particle size (nm) | Normalized variance (%) | Volume fraction (%) | |
| Color filter 1 | 15 | [40] | 93.9 | 43 | [40] | 4.1 | 194 | [40] | 2.0 | 6.1 |
| Color filter 2 | 21 | [40] | 95.5 | 54 | [40] | 3.4 | 195 | [40] | 1.1 | 4.5 |
| Color filter 3 | 17 | [40] | 87.5 | 41 | [40] | 11.4 | 315 | [40] | 1.1 | 12.5 |
| Color filter 4 | 16 | [40] | 91.8 | 52 | [40] | 6.4 | 184 | [40] | 1.8 | 8.2 |
| Color filter 5 | 18 | [40] | 86.7 | 60 | [40] | 5.9 | 187 | [40] | 7.4 | 13.3 |
| Color filter 6 | 17 | [40] | 81.0 | 50 | [40] | 15.8 | 210 | [40] | 3.2 | 19.0 |
| Color filter 7 | 16 | [40] | 73.4 | 54 | [40] | 23.6 | 221 | [40] | 3.0 | 26.6 |
| Color filter 8 | 15 | [40] | 92.2 | 40 | [40] | 4.5 | 201 | [40] | 1.3 | 7.8 |
| Color filter 9 | 16 | [40] | 74.8 | 42 | [40] | 20.5 | 191 | [40] | 4.7 | 25.2 |
| Color filter 10 | 16 | [40] | 91.5 | 45 | [40] | 5.6 | 185 | [40] | 2.9 | 8.5 |
| Color filter 11 | 17 | [40] | 73.1 | 43 | [40] | 21.3 | 235 | [40] | 5.6 | 26.9 |

* [40] in Table means that convergence was made while the normalized variance was fixed at 40%.

Examples 1 to 8

An electrode structure was formed on at least one of first and second substrates, and an alignment film having a horizontal alignment property was formed on each of surfaces of the first and second substrates facing each other. Then, a weak rubbing treatment was performed, an IPS cell was made, and a liquid crystal composition 1 described below was sandwiched between the first substrate and the second substrate. Table 3 shows the physical properties of the liquid crystal composition 1. Subsequently, liquid crystal display devices of Examples 1 to 8 were produced using the color filters 1 to 6, 8, and 10 listed in Table 2 ($d_{gap}$=4.0 μm, alignment film AL-1051). The VHR and ID of the produced liquid crystal display devices were measured. The image sticking of the produced liquid crystal display devices was also evaluated. Table 4 shows the results.

[Chem. 22]
| Chemical structure | Proportion | Abbreviation |
|---|---|---|
| 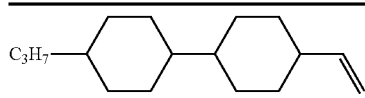 | 48% | 3-Cy—Cy-1d0 |
| 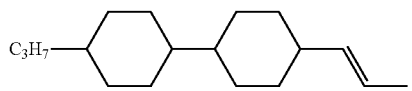 | 4% | 3-Cy—Cy-1d1 |
| 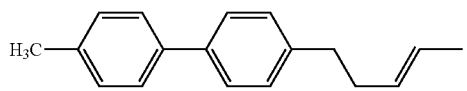 [SMILES: C/C=C/CCc1ccc(-c2ccc(C)cc2)cc1] | 8% | 1-Ph—Ph-3d1 |
| 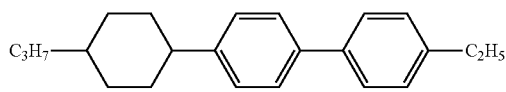 | 5% | 3-Cy—Ph—Ph-2 |
| 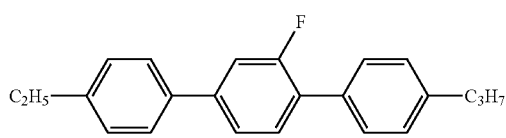 | 5% | 2-Ph—Ph1—Ph-3 |
| 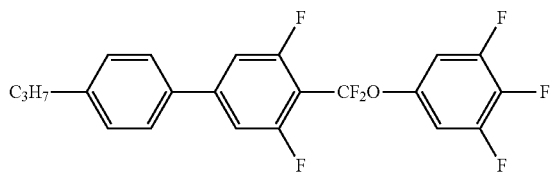 | 2% | 3-Ph—Ph3—CFFO—Ph3—F |
| 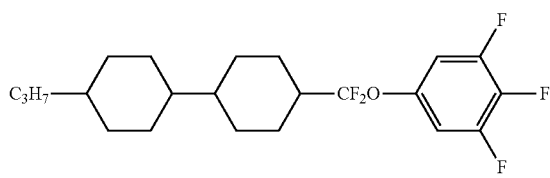 | 3% | 3-Cy—Cy—CFFO—Ph3—F |
| 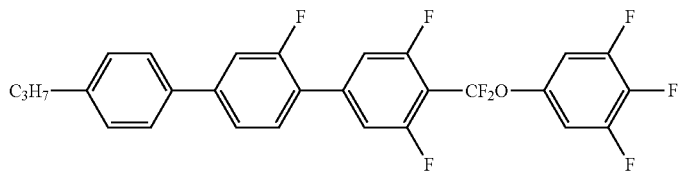 | 7% | 3-Ph—Ph1—Ph3—CFFO—Ph3—F |
| 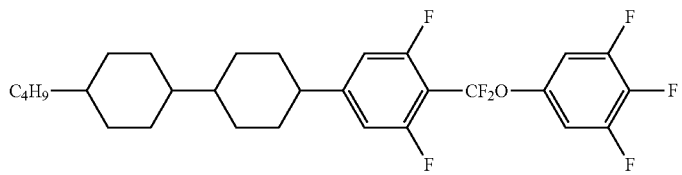 | 5% | 4-Cy—Cy—Ph3—CFFO—Ph3—F |
TABLE 3
| | |
|---|---|
| $T_{NI}/°$ C. | 75.8 |
| $\Delta n$ | 0.112 |
| no | 1.488 |
TABLE 3-continued
| | |
|---|---|
| $\epsilon_\perp$ | 5.5 |
| $\Delta\epsilon$ | 2.9 |
| $\eta$/mPa · s | 13.5 |

TABLE 4

|  | Example 1 | Example 2 | Example 3 | Example 4 | Example 5 | Example 6 | Example 7 | Example 8 |
|---|---|---|---|---|---|---|---|---|
| Liquid crystal composition | Liquid crystal composition 1 | Liquid crystal composition 1 | Liquid crystal composition 1 | Liquid crystal composition 1 | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 | Color filter 5 | Color filter 6 | Color filter 8 | Color filter 10 |
| VHR | 99.5 | 99.6 | 99.4 | 99.5 | 99.4 | 99.3 | 99.5 | 99.6 |
| ID | 20 | 16 | 41 | 35 | 44 | 54 | 25 | 36 |
| Image sticking | A | A | A | A | B | B | A | A |

It was found that the liquid crystal composition 1 had a liquid crystal phase temperature range of 75.8° C., which was practical for use as a liquid crystal composition for TVs, a high absolute value of dielectric anisotropy, low viscosity, and an appropriate value of Δn.

In the liquid crystal display devices of Examples 1 to 8, high VHRs and low IDs were achieved. In the evaluation of image sticking, no residual image was observed or a residual image was slightly observed, which was at an acceptable level.

Examples 9 to 24

Liquid crystal compositions 2 and 3 listed in Table 5 were sandwiched as in Example 1. Liquid crystal display devices of Examples 9 to 24 were produced using the color filters 1 to 6, 8, and 10 listed in Table 2 and the VHR and ID were measured. The image sticking of the liquid crystal display devices was also evaluated. Tables 6 and 7 show the results.

TABLE 5

| Liquid crystal composition 2 | | Liquid crystal composition 3 | |
|---|---|---|---|
| Name of compound | Content (%) | Name of compound | Content (%) |
| 4-Cy-Cy-1d0 | 15 | 5-Cy-Cy-1d0 | 5 |
| 0d1-Cy-Cy-Ph-1 | 4 | 3-Cy-Cy-1d1 | 10 |
| 0d3-Cy-Cy-Ph-1 | 14 | 0d1-Cy-Cy-Ph-1 | 8 |
| 3-Cy-Ph—Ph-Cy-3 | 3 | 5-Cy-Cy-Ph—O1 | 6 |
| 3-Cy-Ph—Ph1-Cy-3 | 4 | 2-Ph—Ph1—Ph-3 | 8 |
| 1-Cy-Cy-Ph3F | 9 | 2-Cy-Cy-Ph3—F | 11 |
| 2-Cy-Ph—Ph3—F | 10 | 3-Cy-Cy-Ph3—F | 15 |
| 3-Cy-Ph—Ph3—F | 10 | 5-Cy-Cy-Ph3—F | 5 |
| 5-Cy-Ph—Ph3—F | 5 | 3-Cy-Ph—Ph3——F | 6 |
| 0d1-Cy-Cy-Ph1—F | 8 | 3-Cy-Ph—Ph1—F | 9 |
| 3-Cy-Cy-Ph1—Ph3—F | 8 | 4-Cy-Cy-Ph—OCFFF | 4 |
| 2-Ph—Ph3—CFFO—Ph3—F | 4 | 3-Cy-Cy-CFFO—Ph3—F | 7 |
| 3-Ph—Ph3—CFFO—Ph3—F | 6 | 5-Cy-Cy-CFFO—Ph3—F | 4 |
| $T_{ni}/°$ C. | 100.7 | 3-Cy-Cy-Ph1—Ph3—F | 2 |
| Δn | 0.094 | $T_{ni}/°$ C. | 103.2 |
| Δ∈ | 8.0 | Δn | 0.102 |
| γ1/mPa · s | 108 | Δ∈ | 7.1 |
| η/mPa · s | 22.2 | γ1/mPa · s | 96 |
|  |  | η/mPa · s | 20.8 |

TABLE 6

|  | Example 9 | Example 10 | Example 11 | Example 12 | Example 13 | Example 14 | Example 15 | Example 16 |
|---|---|---|---|---|---|---|---|---|
| Liquid crystal composition | Liquid crystal composition 2 | Liquid crystal composition 2 | Liquid crystal composition 2 | Liquid crystal composition 2 | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 | Color filter 5 | Color filter 6 | Color filter 8 | Color filter 10 |
| VHR | 99.7 | 99.7 | 99.4 | 99.5 | 99.4 | 99.3 | 99.5 | 99.5 |
| ID | 17 | 14 | 38 | 28 | 42 | 55 | 22 | 34 |
| Image sticking | A | A | A | A | A | B | A | A |

TABLE 7

|  | Example 17 | Example 18 | Example 19 | Example 20 | Example 21 | Example 22 | Example 23 | Example 24 |
|---|---|---|---|---|---|---|---|---|
| Liquid crystal composition | Liquid crystal composition 3 | Liquid crystal composition 3 | Liquid crystal composition 3 | Liquid crystal composition 3 | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 | Color filter 5 | Color filter 6 | Color filter 8 | Color filter 10 |
| VHR | 99.5 | 99.5 | 99.3 | 99.4 | 99.2 | 99.1 | 99.4 | 99.3 |

TABLE 7-continued

|  | Example 17 | Example 18 | Example 19 | Example 20 | Example 21 | Example 22 | Example 23 | Example 24 |
|---|---|---|---|---|---|---|---|---|
| ID | 22 | 19 | 44 | 36 | 49 | 62 | 27 | 38 |
| Image sticking | A | A | A | A | B | B | A | A |

In the liquid crystal display devices of Examples 9 to 24, high VHRs and low IDs were achieved. In the evaluation of image sticking, no residual image was observed or a residual image was slightly observed, which was at an acceptable level.

Examples 25 to 48

Liquid crystal compositions 4 to 6 listed in Table 8 were sandwiched as in Example 1. Liquid crystal display devices of Examples 25 to 48 were produced using the color filters 1 to 6, 8, and 10 listed in Table 2 and the VHR and ID were measured. The image sticking of the liquid crystal display devices was also evaluated. Tables 9 to 11 show the results.

TABLE 8

| Liquid crystal composition 4 | | Liquid crystal composition 5 | | Liquid crystal composition 6 | |
|---|---|---|---|---|---|
| Name of compound | Content (%) | Name of compound | Content (%) | Name of compound | Content (%) |
| 5-Cy-Cy-1d0 | 15 | 5-Cy-Cy-1d0 | 10 | 5-Cy-Cy-1d0 | 12 |
| 3-Cy-Cy-1d1 | 2 | 3-Cy-Cy-1d1 | 5 | 3-Cy-Cy-1d1 | 25 |
| 0d1-Cy-Cy-Ph-1 | 12 | 0d1-Cy-Cy-Ph-1 | 8 | 3-Cy-Cy-1d1 | 12 |
| 2-Ph—Ph1—Ph-3 | 3 | 0d3-Cy-Cy-Ph-1 | 12 | 0d1-Cy-Cy-Ph-1 | 4 |
| 2-Ph—Ph1—Ph-4 | 3 | 2-Ph—Ph1—Ph-5 | 2 | 0d3-Cy-Cy-Ph-1 | 9 |
| 2-Cy-Cy-Ph3—F | 8 | 3-Cy-Ph—Ph-Cy-3 | 3 | 2-Ph—Ph1—Ph3—F | 5 |
| 2-Cy-Ph—Ph3—F | 3 | 3-Cy-Ph—Ph1-Cy-3 | 3 | 3-Ph—Ph1—Ph3—F | 9 |
| 3-Cy-Ph—Ph3—F | 9 | 1-Cy-Cy-Ph3—F | 9 | 2-Ph—Ph3—CFFO—Ph3—F | 4 |
| 4-Cy-Cy-Ph—OCFFF | 14 | 2-Cy-Cy-Ph3—F | 10 | 3-Ph—Ph3—CFFO—Ph3—F | 6 |
| 3-Ph—Ph3—CFFO—Ph3—F | 11 | 3-Cy-Cy-Ph3—F | 6 | 3-Cy-Cy-CFFO—Ph3—F | 2 |
| 2-Cy-Cy-CFFO—Ph3—F | 9 | 5-Cy-Cy-Ph3—F | 5 | 5-Cy-Cy-CFFO—Ph3—F | 3 |
| 3-Cy-Cy-CFFO—Ph3—F | 8 | 0d1-Cy-Cy-Ph1—F | 8 | 3-Cy-Cy-Ph1—Ph3—F | 9 |
| 3-Cy-Cy-Ph1—Ph3—F | 3 | 2-Ph—Ph3—CFFO—Ph3—F | 4 | $T_{ni}/°\,C.$ | 77.4 |
| $T_{ni}/°\,C.$ | 90.2 | 3-Ph—Ph3—CFFO—Ph3—F | 6 | $\Delta n$ | 0.101 |
| $\Delta n$ | 0.098 | 3-Cy-Cy-Ph1—Ph3—F | 9 | $\Delta\epsilon$ | 7.0 |
| $\Delta\epsilon$ | 9.1 | $T_{ni}/°\,C.$ | 110.0 | $\gamma 1/mPa \cdot s$ | 86 |
| $\gamma 1/mPa \cdot s$ | 90 | $\Delta n$ | 0.099 | $\eta/mPa \cdot s$ | 14.2 |
| $\eta/mPa \cdot s$ | 18.1 | $\Delta\epsilon$ | 8.3 | | |
| | | $\gamma 1/mPa \cdot s$ | 112 | | |
| | | $\eta/mPa \cdot s$ | 23.4 | | |

TABLE 9

|  | Example 25 | Example 26 | Example 27 | Example 28 | Example 29 | Example 30 | Example 31 | Example 32 |
|---|---|---|---|---|---|---|---|---|
| Liquid crystal composition | Liquid crystal composition 4 | Liquid crystal composition 4 | Liquid crystal composition 4 | Liquid crystal composition 4 | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 | Color filter 5 | Color filter 6 | Color filter 8 | Color filter 10 |
| VHR | 99.6 | 99.6 | 99.4 | 99.4 | 99.4 | 99.2 | 99.5 | 99.4 |
| ID | 18 | 15 | 45 | 33 | 50 | 68 | 24 | 36 |
| Image sticking | A | A | B | A | B | B | A | A |

TABLE 10

|  | Example 33 | Example 34 | Example 35 | Example 36 | Example 37 | Example 38 | Example 39 | Example 40 |
|---|---|---|---|---|---|---|---|---|
| Liquid crystal composition | Liquid crystal composition 5 | Liquid crystal composition 5 | Liquid crystal composition 5 | Liquid crystal composition 5 | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 | Color filter 5 | Color filter 6 | Color filter 8 | Color filter 10 |

TABLE 10-continued

|  | Example 33 | Example 34 | Example 35 | Example 36 | Example 37 | Example 38 | Example 39 | Example 40 |
|---|---|---|---|---|---|---|---|---|
| VHR | 99.6 | 99.7 | 99.3 | 99.5 | 99.2 | 99.2 | 99.5 | 99.3 |
| ID | 21 | 16 | 46 | 37 | 49 | 58 | 28 | 40 |
| Image sticking | A | A | A | A | A | A | A | A |

TABLE 11

|  | Example 41 | Example 42 | Example 43 | Example 44 | Example 45 | Example 46 | Example 47 | Example 48 |
|---|---|---|---|---|---|---|---|---|
| Liquid crystal composition | Liquid crystal composition 6 | Liquid crystal composition 6 | Liquid crystal composition 6 | Liquid crystal composition 6 | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 | Color filter 5 | Color filter 6 | Color filter 8 | Color filter 10 |
| VHR | 99.6 | 99.6 | 99.3 | 99.5 | 99.2 | 99.1 | 99.5 | 99.3 |
| ID | 19 | 18 | 49 | 31 | 54 | 68 | 24 | 38 |
| Image sticking | A | A | A | A | A | B | A | A |

In the liquid crystal display devices of Examples 25 to 48, high VHRs and low IDs were achieved. In the evaluation of image sticking, no residual image was observed or a residual image was slightly observed, which was at an acceptable level.

Examples 49 to 72

An electrode structure was formed on each of first and second substrates, and an alignment film having a horizontal alignment property was formed on each of surfaces of the first and second substrates facing each other. Then, a weak rubbing treatment was performed, a TN cell was made, and liquid crystal compositions 7 to 9 described in Table 12 were sandwiched between the first substrate and the second substrate. Subsequently, liquid crystal display devices of Examples 49 to 72 were produced using the color filters 1 to 6, 8, and 10 listed in Table 2 ($d_{gap}$=3.5 μm, alignment film SE-7492). The VHR and ID of the produced liquid crystal display devices were measured. The image sticking of the produced liquid crystal display devices was also evaluated. Tables 13 to 15 show the results.

TABLE 12

| Liquid crystal composition 7 | | Liquid crystal composition 8 | | Liquid crystal composition 9 | |
|---|---|---|---|---|---|
| Name of compound | Content (%) | Name of compound | Content (%) | Name of compound | Content (%) |
| 3-Cy-Cy-1d0 | 38 | 3-Cy-Cy-1d0 | 38 | 3-Cy-Cy-1d0 | 30 |
| 3-Cy-Cy-1d1 | 9 | 3-Cy-Cy-1d1 | 14 | 3-Cy-Cy-1d1 | 17 |
| 0d1-Cy-Cy-Ph-1 | 16 | 0d3-Cy-Cy-Ph-1 | 8 | 0d1-Cy-Cy-Ph-1 | 7 |
| 0d3-Cy-Cy-Ph-1 | 4 | 3-Ph—Ph3—CFFO—Ph3—F | 9 | 0d3-Cy-Cy-Ph-1 | 7 |
| 2-Ph—Ph3—CFFO—Ph3—F | 2 | 3-Cy-Cy-CFFO—Ph3—F | 15 | 3-Cy-Cy-Ph-2 | 2 |
| 3-Ph—Ph3—CFFO—Ph3—F | 12 | 3-Ph—Ph1—Ph3—CFFO—Ph3—F | 2 | 2-Ph—Ph1—Ph-4 | 2 |
| 3-Cy-Cy-CFFO—Ph3—F | 7 | 4-Ph—Ph1—Ph3—CFFO—Ph3—F | 7 | 2-Ph—Ph1—Ph3—F | 8 |
| 3-Ph—Ph—Ph1—Ph3—F | 1 | 5-Ph—Ph1—Ph3—CFFO—Ph3—F | 7 | 3-Ph—Ph1—Ph3—F | 12 |
| 3-Ph—Ph1—Ph3—CFFO—Ph3—F | 2 | $T_{ni}$/° C. | 81.8 | 3-Ph—Ph3—Ph3—F | 4 |
| 2-Py—Ph—Ph3—CFFO—Ph3—F | 9 | Δn | 0.099 | 3-Cy-Cy-Ph1—CFFO—Ph3—F | 11 |
| $T_{ni}$/° C. | 76.0 | Δ∈ | 8.0 | $T_{ni}$/° C. | 75.0 |
| Δn | 0.097 | γ1/mPa · s | 83 | Δn | 0.112 |
| Δ∈ | 6.8 | η/mPa · s | 14.6 | Δ∈ | 8.7 |
| γ1/mPa · s | 83 | | | γ1/mPa · s | 87 |
| η/mPa · s | 14.5 | | | η/mPa · s | 15.2 |

TABLE 13

|  | Example 49 | Example 50 | Example 51 | Example 52 | Example 53 | Example 54 | Example 55 | Example 56 |
|---|---|---|---|---|---|---|---|---|
| Liquid crystal composition | Liquid crystal composition 7 | Liquid crystal composition 7 | Liquid crystal composition 7 | Liquid crystal composition 7 | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 | Color filter 5 | Color filter 6 | Color filter 8 | Color filter 10 |
| VHR | 99.6 | 99.6 | 99.3 | 99.4 | 99.3 | 99.2 | 99.5 | 99.4 |
| ID | 24 | 20 | 50 | 37 | 57 | 69 | 29 | 44 |
| Image sticking | A | A | A | A | B | B | A | A |

TABLE 14

|  | Example 57 | Example 58 | Example 59 | Example 60 | Example 61 | Example 62 | Example 63 | Example 64 |
|---|---|---|---|---|---|---|---|---|
| Liquid crystal composition | Liquid crystal composition 8 | Liquid crystal composition 8 | Liquid crystal composition 8 | Liquid crystal composition 8 | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 | Color filter 5 | Color filter 6 | Color filter 8 | Color filter 10 |
| VHR | 99.6 | 99.7 | 99.4 | 99.5 | 99.3 | 99.1 | 99.6 | 99.5 |
| ID | 15 | 12 | 35 | 25 | 39 | 49 | 19 | 27 |
| Image sticking | A | A | A | A | A | A | A | A |

TABLE 15

|  | Example 65 | Example 66 | Example 67 | Example 68 | Example 69 | Example 70 | Example 71 | Example 72 |
|---|---|---|---|---|---|---|---|---|
| Liquid crystal composition | Liquid crystal composition 9 | Liquid crystal composition 9 | Liquid crystal composition 9 | Liquid crystal composition 9 | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 | Color filter 5 | Color filter 6 | Color filter 8 | Color filter 10 |
| VHR | 99.4 | 99.5 | 99.3 | 99.3 | 99.2 | 99.1 | 99.4 | 99.3 |
| ID | 27 | 24 | 44 | 36 | 48 | 70 | 33 | 38 |
| Image sticking | A | A | B | A | A | B | A | A |

In the liquid crystal display devices of Examples 49 to 72, high VHRs and low IDs were achieved. In the evaluation of image sticking, no residual image was observed or a residual image was slightly observed, which was at an acceptable level.

Examples 73 to 88

An electrode structure was formed on at least one of first and second substrates, and an alignment film having a horizontal alignment property was formed on each of surfaces of the first and second substrates facing each other. Then, a weak rubbing treatment was performed, an FFS cell was made, and liquid crystal compositions 10 and 11 described in Table 16 were sandwiched between the first substrate and the second substrate. Subsequently, liquid crystal display devices of Examples 73 to 88 were produced using the color filters 1 to 6, 8, and 10 listed in Table 2 ($d_{gap}$=4.0 μm, alignment film AL-1051). The VHR and ID of the produced liquid crystal display devices were measured. The image sticking of the produced liquid crystal display devices was also evaluated. Tables 17 and 18 show the results.

TABLE 16

| Liquid crystal composition 10 | | Liquid crystal composition 11 | |
|---|---|---|---|
| Name of compound | Content (%) | Name of compound | Content (%) |
| 3-Cy-Cy-1d0 | 39 | 3-Cy-Cy-1d0 | 44 |
| 3-Cy-Cy-1d1 | 7 | 3-Cy-Cy-1d1 | 3 |
| 0d1-Cy-Cy-Ph-1 | 11 | 2-Ph—Ph-3d1 | 13 |
| 2-Ph—Ph1—Ph-3 | 8 | 3-Cy-Ph—Ph-2 | 7 |
| 2-Ph—Ph1—Ph-5 | 8 | 2-Ph—Ph1—Ph-3 | 8 |
| 3-Ph—Ph3—CFFO—Ph3—F | 10 | 3-Ph—Ph1—Ph-3 | 7 |
| 3-Cy-Cy-Ph—Ph3—F | 6 | 3-Ph—Ph1—Ph3—CFFO—Ph3—F | 9 |
| 4-Ph—Ph1—Ph3—CFFO—Ph3—F | 11 | 4-Cy-Cy-Ph1—CFFO—Ph3—F | 3 |
| $T_{ni}$/° C. | 76.0 | 3-Cy-Ph3—Ph1—OCFFF | 6 |
| Δn | 0.114 | $T_{ni}$/° C. | 77.9 |
| Δε | 6.0 | Δn | 0.131 |
| γ1/mPa·s | 77 | Δε | 4.6 |
| η/mPa·s | 13.3 | γ1/mPa·s | 74 |
|  |  | η/mPa·s | 124 |

TABLE 17

|  | Example 73 | Example 74 | Example 75 | Example 76 | Example 77 | Example 78 | Example 79 | Example 80 |
|---|---|---|---|---|---|---|---|---|
| Liquid crystal composition | Liquid crystal composition 10 | Liquid crystal composition 10 | Liquid crystal composition 10 | Liquid crystal composition 10 | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 | Color filter 5 | Color filter 6 | Color filter 8 | Color filter 10 |
| VHR | 99.6 | 99.6 | 99.4 | 99.5 | 99.3 | 99.2 | 99.5 | 99.4 |
| ID | 19 | 17 | 43 | 29 | 47 | 59 | 24 | 35 |
| Image sticking | A | A | B | A | B | B | A | A |

TABLE 18

|  | Example 81 | Example 82 | Example 83 | Example 84 | Example 85 | Example 86 | Example 87 | Example 88 |
|---|---|---|---|---|---|---|---|---|
| Liquid crystal composition | Liquid crystal composition 11 | Liquid crystal composition 11 | Liquid crystal composition 11 | Liquid crystal composition 11 | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 | Color filter 5 | Color filter 6 | Color filter 8 | Color filter 10 |
| VHR | 99.7 | 99.7 | 99.4 | 99.5 | 99.4 | 99.3 | 99.6 | 99.5 |
| ID | 18 | 16 | 38 | 31 | 45 | 55 | 25 | 33 |
| Image sticking | A | A | A | A | B | B | A | A |

In the liquid crystal display devices of Examples 73 to 88, high VHRs and low IDs were achieved. In the evaluation of image sticking, no residual image was observed or a residual image was slightly observed, which was at an acceptable level.

Examples 89 to 104

Liquid crystal compositions 12 and 13 listed in Table 19 were sandwiched as in Example 73. Liquid crystal display devices of Examples 89 to 104 were produced using the color filters 1 to 6, 8, and 10 listed in Table 2 and the VHR and ID were measured. The image sticking of the liquid crystal display devices was also evaluated. Tables 20 and 21 show the results.

TABLE 19

| Liquid crystal composition 12 | | Liquid crystal composition 13 | |
|---|---|---|---|
| Name of compound | Content (%) | Name of compound | Content (%) |
| 3-Cy-Cy-1d0 | 47 | 3-Cy-Cy-1d0 | 10 |
| 3-Cy-Cy-1d1 | 9 | 3-Cy-Cy-1d1 | 6 |
| 3-Cy-Cy-Ph-2 | 7 | 3-Cy-Cy-1d1-F | 28 |
| 2-Ph-Ph1-Ph-3 | 4 | 0d1-Cy-Cy-Ph-1 | 11 |
| 2-Ph-Ph1-Ph-5 | 7 | 0d3-Cy-Cy-Ph-1 | 10 |
| 3-Cy-Ph-Ph-Cy-3 | 2 | 2-Ph-Ph1-Ph-3 | 10 |
| 2-Ph-Ph1-Ph-3 | 6 | 2-Ph-Ph1-Ph-5 | 10 |
| 3-Ph-Ph1-Ph-3 | 7 | 5-Cy-Ph-Ph1-Ph-2 | 2 |
| 3-Ph-Ph3-CFFO-Ph3-F | 2 | 3-Ph-Ph3-CFFO-Ph3-F | 7 |
| 3-Cy-Cy-Ph1-Ph3-F | 2 | 3-Cy-Cy-Ph1-CFFO-Ph3-F | 6 |
| 3-Cy-Ph-Ph3-Ph1-OCFFF | 7 | $T_{ni}/°C$ | 80.0 |
| $T_{ni}/°C$ | 80.6 | $\Delta n$ | 0.110 |
| $\Delta n$ | 0.122 | $\Delta \epsilon$ | 5.9 |
| $\Delta \epsilon$ | 6.0 | $\gamma 1/mPa \cdot s$ | 68 |
| $\gamma 1/mPa \cdot s$ | 65 | $\eta/mPa \cdot s$ | 11.6 |
| $\eta/mPa \cdot s$ | 11.1 | | |

TABLE 20

|  | Example 89 | Example 90 | Example 91 | Example 92 | Example 93 | Example 94 | Example 95 | Example 96 |
|---|---|---|---|---|---|---|---|---|
| Liquid crystal composition | Liquid crystal composition 12 | Liquid crystal composition 12 | Liquid crystal composition 12 | Liquid crystal composition 12 | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 | Color filter 5 | Color filter 6 | Color filter 8 | Color filter 10 |
| VHR | 99.7 | 99.8 | 99.4 | 99.5 | 99.4 | 99.3 | 99.6 | 99.5 |
| ID | 18 | 13 | 37 | 29 | 44 | 53 | 23 | 30 |
| Image sticking | A | A | A | A | A | A | A | A |

TABLE 21

|  | Example 97 | Example 98 | Example 99 | Example 100 | Example 101 | Example 102 | Example 103 | Example 104 |
|---|---|---|---|---|---|---|---|---|
| Liquid crystal composition | Liquid crystal composition 13 | Liquid crystal composition 13 | Liquid crystal composition 13 | Liquid crystal composition 13 | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 | Color filter 5 | Color filter 6 | Color filter 8 | Color filter 10 |
| VHR | 99.6 | 99.6 | 99.3 | 99.5 | 99.3 | 99.2 | 99.5 | 99.4 |
| ID | 24 | 20 | 46 | 37 | 50 | 70 | 29 | 39 |
| Image sticking | A | A | A | A | A | B | A | A |

In the liquid crystal display devices of Examples 89 to 104, high VHRs and low IDs were achieved. In the evaluation of image sticking, no residual image was observed or a residual image was slightly observed, which was at an acceptable level.

Examples 105 to 112

A liquid crystal composition 14 was prepared by mixing 0.3% by mass of bismethacrylic acid biphenyl-4,4'-diyl with the liquid crystal composition 10 used in Example 73. The liquid crystal composition 14 was set in the TN cell. A polymerization treatment was performed by performing irradiation with ultraviolet rays (3.0 J/cm$^2$) for 600 seconds while applying a driving voltage between electrodes. Liquid crystal display devices of Examples 105 to 112 were then produced using the color filters 1 to 6, 8, and 10 listed in Table 2 and the VHR and ID were measured. The image sticking of the liquid crystal display devices was also evaluated. Table 22 shows the results.

TABLE 22

|  | Example 105 | Example 106 | Example 107 | Example 108 | Example 109 | Example 110 | Example 111 | Example 112 |
| --- | --- | --- | --- | --- | --- | --- | --- | --- |
| Liquid crystal composition | Liquid crystal composition 14 | Liquid crystal composition 14 | Liquid crystal composition 14 | Liquid crystal composition 14 | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 | Color filter 5 | Color filter 6 | Color filter 8 | Color filter 10 |
| VHR | 99.6 | 99.7 | 99.4 | 99.5 | 99.4 | 99.3 | 99.5 | 99.4 |
| ID | 18 | 14 | 40 | 32 | 43 | 66 | 25 | 33 |
| Image sticking | A | A | A | A | A | B | A | A |

In the liquid crystal display devices of Examples 105 to 112, high VHRs and low IDs were achieved. In the evaluation of image sticking, no residual image was observed or a residual image was slightly observed, which was at an acceptable level.

Examples 113 to 120

A liquid crystal composition 15 was prepared by mixing 0.3% by mass of bismethacrylic acid biphenyl-4,4'-diyl with the liquid crystal composition 8 used in Example 57. The liquid crystal composition 15 was set in the IPS cell. A polymerization treatment was performed by performing irradiation with ultraviolet rays (3.0 J/cm$^2$) for 600 seconds while applying a driving voltage between electrodes. Liquid crystal display devices of Examples 113 to 120 were then produced using the color filters 1 to 6, 8, and 10 listed in Table 2 and the VHR and ID were measured. The image sticking of the liquid crystal display devices was also evaluated. Table 23 shows the results.

TABLE 23

|  | Example 113 | Example 114 | Example 115 | Example 116 | Example 117 | Example 118 | Example 119 | Example 120 |
| --- | --- | --- | --- | --- | --- | --- | --- | --- |
| Liquid crystal composition | Liquid crystal composition 15 | Liquid crystal composition 15 | Liquid crystal composition 15 | Liquid crystal composition 15 | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 | Color filter 5 | Color filter 6 | Color filter 8 | Color filter 10 |
| VHR | 99.5 | 99.6 | 99.4 | 99.5 | 99.3 | 99.2 | 99.4 | 99.5 |
| ID | 25 | 19 | 45 | 35 | 49 | 59 | 29 | 37 |
| Image sticking | A | A | B | A | B | B | A | A |

In the liquid crystal display devices of Examples 113 to 120, high VHRs and low IDs were achieved. In the evaluation of image sticking, no residual image was observed or a residual image was slightly observed, which was at an acceptable level.

Examples 121 to 128

A liquid crystal composition 16 was prepared by mixing 0.3% by mass of bismethacrylic acid 3-fluorobiphenyl-4,4'-diyl with the liquid crystal composition 6 used in Example 41. The liquid crystal composition 16 was set in the FFS cell. A polymerization treatment was performed by performing irradiation with ultraviolet rays (3.0 J/cm$^2$) for 600 seconds while applying a driving voltage between electrodes. Liquid crystal display devices of Examples 121 to 128 were then produced using the color filters 1 to 6, 8, and 10 listed in Table 2 and the VHR and ID were measured. The image sticking of the liquid crystal display devices was also evaluated. Table 24 shows the results.

TABLE 24

|  | Example 121 | Example 122 | Example 123 | Example 124 | Example 125 | Example 126 | Example 127 | Example 128 |
|---|---|---|---|---|---|---|---|---|
| Liquid crystal composition | Liquid crystal composition 16 | Liquid crystal composition 16 | Liquid crystal composition 16 | Liquid crystal composition 16 | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 | Color filter 5 | Color filter 6 | Color filter 8 | Color filter 10 |
| VHR | 99.4 | 99.5 | 99.2 | 99.3 | 99.2 | 99.0 | 99.4 | 99.3 |
| ID | 26 | 23 | 45 | 35 | 52 | 63 | 30 | 36 |
| Image sticking | A | A | A | A | A | B | A | A |

In the liquid crystal display devices of Examples 121 to 128, high VHRs and low IDs were achieved. In the evaluation of image sticking, no residual image was observed or a residual image was slightly observed, which was at an acceptable level.

Comparative Examples 1 to 8

A comparative liquid crystal composition 1 described below was set in the IPS cell used in Example 1. Table 25 shows the physical properties of the comparative liquid crystal composition. Liquid crystal display devices of Comparative Examples 1 to 8 were then produced using the color filters 1 to 6, 8, and 10 listed in Table 2 and the VHR and ID were measured. The image sticking of the liquid crystal display devices was also evaluated. Table 26 shows the results.

[Chem. 23]

| Chemical structure | Proportion | Abbreviation |
|---|---|---|
| $C_4H_9$—Cy—COO—Ph—$CH_3$ | 27% | 4-Cy—VO—Ph-1 |
| $C_5H_{11}$—Cy—COO—Ph—$CH_3$ | 20% | 5-Cy—VO—Ph-1 |
| $C_5H_{11}$—Cy—COO—Ph—$C_3H_7$ | 20% | 5-Cy—VO—Ph-3 |
| $C_3H_7$—Ph—Ph(F,F)—$CF_2O$—Ph(F,F)—F | 8% | 3-Ph—Ph3—CFFO—Ph3—F |
| $C_3H_7$—Cy—Cy—$CF_2O$—Ph(F,F)—F | 13% | 3-Cy—Cy—CFFO—Ph3—F |

[Chem. 23]

| Chemical structure | Proportion | Abbreviation |
|---|---|---|
| 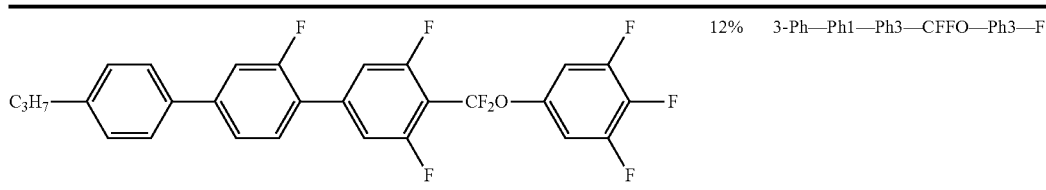 | 12% | 3-Ph—Ph1—Ph3—CFFO—Ph3—F |

TABLE 25

| | |
|---|---|
| $T_{NI}/°C$ | 69.3 |
| $\Delta n$ | 0.096 |
| no | 1.484 |
| $\epsilon_\perp$ | 5.5 |
| $\Delta\epsilon$ | 4.8 |
| $\eta$/mPa · s | 30.3 |

TABLE 26

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Liquid crystal composition | Comparative liquid crystal composition 1 | Comparative liquid crystal composition 1 | Comparative liquid crystal composition 1 | Comparative liquid crystal composition 1 | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 | Color filter 5 | Color filter 6 | Color filter 8 | Color filter 10 |
| VHR | 98.2 | 98.3 | 97.9 | 98.0 | 97.7 | 97.5 | 98.1 | 97.9 |
| ID | 153 | 145 | 178 | 162 | 182 | 210 | 159 | 164 |
| Image sticking | C | C | D | D | D | D | D | D |

In the liquid crystal display devices of Comparative Examples 1 to 8, the VHRs were decreased and the IDs were increased compared with the liquid crystal display devices of the present invention. In the evaluation of image sticking, a residual image was observed, which was at an unacceptable level.

Comparative Example 9 to 24

Comparative liquid crystal compositions 2 and 3 listed in Table 27 were sandwiched as in Example 1. Liquid crystal display devices of Comparative Examples 9 to 24 were produced using the color filters 1 to 6, 8, and 10 listed in Table 2 and the VHR and ID were measured. The image sticking of the liquid crystal display devices was also evaluated. Tables 28 and 29 show the results.

TABLE 27

| Comparative liquid crystal composition 2 | | Comparative liquid crystal composition 3 | |
|---|---|---|---|
| Name of compound | Content (%) | Name of compound | Content (%) |
| 2-Cy-Cy-Ph3—F | 12 | 2-Cy-Cy-Ph3—F | 12 |
| 3-Cy-Cy-Ph3—F | 10 | 3-Cy-Cy-Ph3—F | 10 |
| 5-Cy-Cy-Ph3—F | 6 | 2-Cy-Cy-Ph—OCFFF | 8 |
| 2-Cy-Cy-Ph—OCFFF | 9 | 3-Cy-Cy-Ph—OCFFF | 8 |
| 3-Cy-Cy-Ph—OCFFF | 8 | 4-Cy-Cy-Ph—OCFFF | 7 |
| 4-Cy-Cy-Ph—OCFFF | 7 | 5-Cy-Cy-Ph—OCFFF | 4 |
| 2-Cy-Ph1—Ph3—F | 12 | 2-Cy-Ph1—Ph3—F | 12 |
| 3-Cy-Ph1—Ph3—F | 10 | 3-Cy-Ph1—Ph3—F | 4 |
| 2-Cy-Py-Cy-CFFO—Ph3—F | 5.5 | 2-Cy-Cy-CFFO—Ph3—F | 12 |
| 2-Ph—Ph1—Ph3—F | 5.5 | 2-Ph—Ph1—Ph3—F | 8 |

TABLE 27-continued

| Comparative liquid crystal composition 2 | | Comparative liquid crystal composition 3 | |
|---|---|---|---|
| Name of compound | Content (%) | Name of compound | Content (%) |
| 0d1-Cy-Cy-CFFO—Ph3—F | 15 | 0d1-Cy-Cy-CFFO—Ph3—F | 15 |
| $T_{ni}/°$ C. | 75.7 | $T_{ni}/°$ C. | 75.0 |
| wj$\Delta$n | 0.093 | $\Delta$n | 0.093 |
| $\gamma 1$/mPa·s | 146 | $\gamma 1$/mPa·s | 139 |

TABLE 28

| | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| Liquid crystal composition | Comparative liquid crystal composition 2 | Comparative liquid crystal composition 2 | Comparative liquid crystal composition 2 | Comparative liquid crystal composition 2 | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 | Color filter 5 | Color filter 6 | Color filter 8 | Color filter 10 |
| VHR | 98.3 | 98.4 | 97.9 | 98.2 | 97.7 | 97.5 | 98.3 | 98.1 |
| ID | 149 | 140 | 187 | 166 | 190 | 209 | 162 | 169 |
| Image sticking | D | C | D | D | D | D | D | D |

TABLE 29

| | Comparative Example 17 | Comparative Example 18 | Comparative Example 19 | Comparative Example 20 | Comparative Example 21 | Comparative Example 22 | Comparative Example 23 | Comparative Example 24 |
|---|---|---|---|---|---|---|---|---|
| Liquid crystal composition | Comparative liquid crystal composition 3 | Comparative liquid crystal composition 3 | Comparative liquid crystal composition 3 | Comparative liquid crystal composition 3 | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 | Color filter 5 | Color filter 6 | Color filter 8 | Color filter 10 |
| VHR | 98.3 | 98.4 | 97.5 | 97.9 | 97.5 | 97.2 | 98.1 | 97.7 |
| ID | 150 | 143 | 181 | 164 | 185 | 214 | 160 | 165 |
| Image sticking | C | C | D | D | D | D | D | C |

In the liquid crystal display devices of Comparative Examples 9 to 24, the VHRs were decreased and the IDs were increased compared with the liquid crystal display devices of the present invention. In the evaluation of image sticking, a residual image was observed, which was at an unacceptable level.

Comparative Examples 25 to 40

Comparative liquid crystal compositions 4 and 5 listed in Table 30 were sandwiched as in Example 1. Liquid crystal display devices of Comparative Examples 25 to 40 were produced using the color filters 1 to 6, 8, and 10 listed in Table 2 and the VHR and ID were measured. The image sticking of the liquid crystal display devices was also evaluated. Tables 31 and 32 show the results.

TABLE 30

| Comparative liquid crystal composition 4 | | Comparative liquid crystal composition 5 | |
|---|---|---|---|
| Name of compound | Content (%) | Name of compound | Content (%) |
| 4-Cy-Cy-1d0 | 15 | 2-Cy-Cy-1d0 | 32 |
| 0d1-Cy-Cy-Ph-1 | 4 | 0d1-Cy-Cy-Ph-1 | 4 |
| 0d3-Cy-Cy-Ph-1 | 14 | 2-Ph—Ph1—Ph-3 | 10 |
| 3-Cy-Ph—Ph-Cy-3 | 3 | 2-Ph—Ph1—Ph-5 | 11 |
| 3-Cy-Ph—Ph1-Cy-3 | 4 | 3-Ph—Ph1—Ph-5 | 7 |
| 1-Cy-Cy-Ph3—F | 9 | 2-Cy-Cy-Ph—F | 6 |
| 2-Cy-Cy-Ph3—F | 10 | 3-Cy-Cy-Ph—F | 21 |
| 3-Cy-Cy-Ph3—F | 10 | 5-Cy-Ph—Ph—F | 7 |
| 5-Cy-Cy-Ph3—F | 5 | 3-Cy-Ph—Ph3—F | 2 |
| 3-Cy-Ph1—Ph3—F | 8 | $T_{ni}/°$ C. | 77.2 |
| 5-Cy-Ph1—Ph3—F | 7 | $\Delta$n | 0.135 |
| 3-Ph—Ph1—Ph3—F | 3 | $\Delta\epsilon$ | 4.5 |
| 3-Cy-Cy-Ph1—Ph3—F | 8 | $\gamma 1$/mPa·s | 57 |
| $T_{ni}/°$ C. | 101.0 | $\eta$/mPa·s | 10.5 |
| $\Delta$n | 0.095 | | |
| $\Delta\epsilon$ | 8.2 | | |
| $\gamma 1$/mPa·s | 115 | | |
| $\eta$/mPa·s | 23.6 | | |

TABLE 31

|  | Comparative Example 25 | Comparative Example 26 | Comparative Example 27 | Comparative Example 28 | Comparative Example 29 | Comparative Example 30 | Comparative Example 31 | Comparative Example 32 |
|---|---|---|---|---|---|---|---|---|
| Liquid crystal composition | Comparative liquid crystal composition 4 | Comparative liquid crystal composition 4 | Comparative liquid crystal composition 4 | Comparative liquid crystal composition 4 | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 | Color filter 5 | Color filter 6 | Color filter 8 | Color filter 10 |
| VHR | 98.1 | 98.3 | 97.6 | 97.9 | 97.4 | 97.1 | 98.0 | 97.8 |
| ID | 155 | 146 | 190 | 174 | 194 | 224 | 170 | 177 |
| Image sticking | D | D | D | D | D | D | D | D |

TABLE 32

|  | Comparative Example 33 | Comparative Example 34 | Comparative Example 35 | Comparative Example 36 | Comparative Example 37 | Comparative Example 38 | Comparative Example 39 | Comparative Example 40 |
|---|---|---|---|---|---|---|---|---|
| Liquid crystal composition | Comparative liquid crystal composition 5 | Comparative liquid crystal composition 5 | Comparative liquid crystal composition 5 | Comparative liquid crystal composition 5 | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 | Color filter 5 | Color filter 6 | Color filter 8 | Color filter 10 |
| VHR | 98.4 | 98.5 | 97.8 | 98.1 | 97.6 | 97.5 | 98.2 | 98.1 |
| ID | 144 | 139 | 180 | 155 | 188 | 206 | 148 | 155 |
| Image sticking | C | C | D | D | D | D | C | D |

In the liquid crystal display devices of Comparative Examples 25 to 40, the VHRs were decreased and the IDs were increased compared with the liquid crystal display devices of the present invention. In the evaluation of image sticking, a residual image was observed, which was at an unacceptable level.

Comparative Examples 41 to 64

Comparative liquid crystal compositions 6 to 8 listed in Table 33 were sandwiched as in Example 1. Liquid crystal display devices of Comparative Examples 41 to 64 were produced using the color filters 1 to 6, 8, and 10 listed in Table 2 and the VHR and ID were measured. The image sticking of the liquid crystal display devices was also evaluated. Tables 34 to 36 show the results.

TABLE 33

| Comparative liquid crystal composition 6 | | Comparative liquid crystal composition 7 | | Comparative liquid crystal composition 8 | |
|---|---|---|---|---|---|
| Name of compound | Content (%) | Name of compound | Content (%) | Name of compound | Content (%) |
| 4-Cy-Cy-1d0 | 18 | 4-Cy-Cy-1d0 | 18 | 4-Cy-Cy-1d0 | 17 |
| 3-Cy-Cy-4 | 15 | 3-Cy-Cy-4 | 15 | 3-Cy-Cy-4 | 15 |
| 0d1-Cy-Cy-Ph-1 | 8 | 0d1-Cy-Cy-Ph-1 | 8 | 0d3-Cy-Cy-Ph-1 | 8 |
| 2-Ph—Ph1—Ph-3 | 10 | 2-Ph—Ph1—Ph-3 | 10 | 3-Cy-Ph—Ph-2 | 10 |
| 2-Ph—Ph1—Ph-5 | 6 | 2-Ph—Ph1—Ph-5 | 6 | 2-Ph—Ph1—Ph-5 | 7 |
| 3-Ph—Ph1—Ph-5 | 6 | 3-Ph—Ph1—Ph-5 | 5 | 3-Ph—Ph1—Ph-5 | 7 |
| 2-Cy-Cy-Ph—F | 6 | 2-Cy-Cy-Ph—F | 6 | 2-Cy-Cy-Ph—F | 6 |
| 3-Cy-Cy-Ph—F | 10 | 3-Cy-Cy-Ph—F | 5 | 3-Cy-Cy-Ph—F | 5 |
| 5-Cy-Ph—Ph—F | 7 | 5-Cy-Ph—Ph—F | 7 | 5-Cy-Ph—Ph—F | 7 |
| 3-Cy-Ph—Ph3—F | 14 | 3-Cy-Ph—Ph3—F | 15 | 3-Cy-Ph—Ph3—F | 14 |
| $T_{ni}/°$ C. | 73.5 | 3-Cy-Cy-Ph1—Ph3—F | 5 | 3-Cy-Cy-Ph1—Ph3—F | 4 |
| $\Delta n$ | 0.126 | $T_{ni}/°$ C. | 75.7 | $T_{ni}/°$ C. | 85.3 |
| $\Delta \epsilon$ | 4.9 | $\Delta n$ | 0.125 | $\Delta n$ | 0.128 |
| $\gamma 1/mPa \cdot s$ | 94 | $\Delta \epsilon$ | 5.5 | $\Delta \epsilon$ | 4.8 |
| $\eta/mPa \cdot s$ | 16.9 | $\gamma 1/mPa \cdot s$ | 103 | $\gamma 1/mPa \cdot s$ | 107 |
|  |  | $\eta/mPa \cdot s$ | 18.4 | $\eta/mPa \cdot s$ | 19.0 |

TABLE 34

|  | Comparative Example 41 | Comparative Example 42 | Comparative Example 43 | Comparative Example 44 | Comparative Example 45 | Comparative Example 46 | Comparative Example 47 | Comparative Example 48 |
|---|---|---|---|---|---|---|---|---|
| Liquid crystal composition | Comparative liquid crystal composition 6 | Comparative liquid crystal composition 6 | Comparative liquid crystal composition 6 | Comparative liquid crystal composition 6 | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 | Color filter 5 | Color filter 6 | Color filter 8 | Color filter 10 |
| VHR | 98.3 | 98.5 | 97.9 | 98.0 | 97.8 | 97.4 | 98.2 | 97.9 |
| ID | 137 | 130 | 177 | 157 | 181 | 208 | 151 | 159 |
| Image sticking | C | C | D | D | D | D | D | D |

TABLE 35

|  | Comparative Example 49 | Comparative Example 50 | Comparative Example 51 | Comparative Example 52 | Comparative Example 53 | Comparative Example 54 | Comparative Example 55 | Comparative Example 56 |
|---|---|---|---|---|---|---|---|---|
| Liquid crystal composition | Comparative liquid crystal composition 7 | Comparative liquid crystal composition 7 | Comparative liquid crystal composition 7 | Comparative liquid crystal composition 7 | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 | Color filter 5 | Color filter 6 | Color filter 8 | Color filter 10 |
| VHR | 98.4 | 98.4 | 97.7 | 98.0 | 97.5 | 97.3 | 98.2 | 97.8 |
| ID | 145 | 139 | 172 | 163 | 178 | 199 | 155 | 167 |
| Image sticking | C | D | D | D | D | D | D | D |

TABLE 36

|  | Comparative Example 57 | Comparative Example 58 | Comparative Example 59 | Comparative Example 60 | Comparative Example 61 | Comparative Example 62 | Comparative Example 63 | Comparative Example 64 |
|---|---|---|---|---|---|---|---|---|
| Liquid crystal composition | Comparative liquid crystal composition 8 | Comparative liquid crystal composition 8 | Comparative liquid crystal composition 8 | Comparative liquid crystal composition 8 | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 | Color filter 5 | Color filter 6 | Color filter 8 | Color filter 10 |
| VHR | 98.4 | 98.6 | 97.8 | 98.2 | 97.8 | 97.6 | 98.3 | 98.0 |
| ID | 136 | 129 | 175 | 165 | 182 | 203 | 158 | 166 |
| Image sticking | C | C | D | D | D | D | D | D |

In the liquid crystal display devices of Comparative Examples 41 to 64, the VHRs were decreased and the IDs were increased compared with the liquid crystal display devices of the present invention. In the evaluation of image sticking, a residual image was observed, which was at an unacceptable level.

Comparative Examples 65 to 88

Comparative liquid crystal compositions 9 to 11 listed in Table 37 were sandwiched as in Example 1. Liquid crystal display devices of Comparative Examples 65 to 88 were produced using the color filters 1 to 6, 8, and 10 listed in Table 2 and the VHR and ID were measured. The image sticking of the liquid crystal display devices was also evaluated. Tables 38 to 40 show the results.

TABLE 37

| Comparative liquid crystal composition 9 | | Comparative liquid crystal composition 10 | | Comparative liquid crystal composition 11 | |
|---|---|---|---|---|---|
| Name of compound | Content (%) | Name of compound | Content (%) | Name of compound | Content (%) |
| 2-Cy-Cy-Ph3—F | 10 | 2-Cy-Cy-Ph3—F | 10 | 2-Cy-Cy-Ph3—F | 10 |
| 0d1-Cy-Cy-Ph1—F | 8 | 0d1-Cy-Cy-Ph1—F | 8 | 0d1-Cy-Cy-Ph1—F | 8 |
| 2-Ph—Ph3—CFFO—Ph3—F | 4 | 2-Ph—Ph3—CFFO—Ph3—F | 4 | 3-Cy-Cy-Ph3—F | 10 |
| 3-Cy-Cy-Ph3—F | 10 | 3-Cy-Cy-Ph3—F | 10 | 2-Ph—Ph3—CFFO—Ph3—F | 6 |

TABLE 37-continued

| Comparative liquid crystal composition 9 | | Comparative liquid crystal composition 10 | | Comparative liquid crystal composition 11 | |
|---|---|---|---|---|---|
| Name of compound | Content (%) | Name of compound | Content (%) | Name of compound | Content (%) |
| 2-Ph—Ph3—CFFO—Ph3—F | 6 | 2-Ph—Ph3—CFFO—Ph3—F | 6 | 3-Cy-Cy-Ph1—Ph3—F | 8 |
| 3-Cy-Cy-Ph1—Ph3—F | 8 | 3-Cy-Cy-Ph1—Ph3—F | 8 | 5-Cy-Cy-Ph3—F | 5 |
| 1-Cy-Cy-Ph3—F | 9 | 1-Cy-Cy-Ph3—F | 9 | 0d3-Ph-T-Ph-3d0 | 10 |
| 5-Cy-Cy-Ph3—F | 5 | 5-Cy-Cy-Ph3—F | 5 | 3-Cy-Ph3-T-Ph9-1 | 4 |
| 0d3-Ph-T-Ph-3d0 | 15 | 0d3-Ph-T-Ph-3d0 | 10 | 3-Cy-Cy-CFFO—Ph3—F | 4 |
| 3-Cy-Ph-T-Ph-2 | 14 | 3-Cy-Ph3-T-Ph9-1 | 4 | 4-Ph-T-Ph-O2 | 4 |
| 0d3-Ph—N—Ph-3d0 | 4 | 4-Ph-T-Ph—O2 | 4 | 5-Cy-Cy-CFFO—Ph3—F | 9 |
| 3-Ph—VO-Cy-VO—Ph-3 | 4 | 3-Cy-Ph-T-Ph-2 | 7 | 5-Cy-VO—Ph-1 | 5 |
| 3-Cy-Cy-VO—Ph-Cy-3 | 3 | 5-Cy-VO—Ph-1 | 5 | 0d3-Ph—N—Ph-3d0 | 7 |
| $T_{ni}/°C.$ | 101.6 | 3-Ph—VO-Cy-VO—Ph-3 | 7 | 3-Ph—VO-Cy-VO—Ph-3 | 7 |
| Δn | 0.153 | 3-Cy-Cy-VO—Ph-Cy-3 | 3 | 3-Cy-Cy-VO—Ph-Cy-3 | 3 |
| Δ∈ | 9.2 | $T_{ni}/°C.$ | 96.4 | $T_{ni}/°C.$ | 99.2 |
| γ1/mPa·s | 101 | Δn | 0.137 | Δn | 0.136 |
| η/mPa·s | 23.7 | Δ∈ | 8.8 | Δ∈ | 7.8 |
| | | γ1/mPa·s | 90 | γ1/mPa·s | 105 |
| | | η/mPa·s | 25.9 | η/mPa·s | 26.6 |

TABLE 38

| | Comparative Example 65 | Comparative Example 66 | Comparative Example 67 | Comparative Example 68 | Comparative Example 69 | Comparative Example 70 | Comparative Example 71 | Comparative Example 72 |
|---|---|---|---|---|---|---|---|---|
| Liquid crystal composition | Comparative liquid crystal composition 9 | Comparative liquid crystal composition 9 | Comparative liquid crystal composition 9 | Comparative liquid crystal composition 9 | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 | Color filter 5 | Color filter 6 | Color filter 8 | Color filter 10 |
| VHR | 98.4 | 98.4 | 97.8 | 98.2 | 97.5 | 97.2 | 98.2 | 98.1 |
| ID | 152 | 144 | 186 | 168 | 188 | 214 | 164 | 170 |
| Image sticking | D | D | D | D | D | D | D | D |

TABLE 39

| | Comparative Example 73 | Comparative Example 74 | Comparative Example 75 | Comparative Example 76 | Comparative Example 77 | Comparative Example 78 | Comparative Example 79 | Comparative Example 80 |
|---|---|---|---|---|---|---|---|---|
| Liquid crystal composition | Comparative liquid crystal composition 10 | Comparative liquid crystal composition 10 | Comparative liquid crystal composition 10 | Comparative liquid crystal composition 10 | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 | Color filter 5 | Color filter 6 | Color filter 6 | Color filter 6 |
| VHR | 98.2 | 98.3 | 97.5 | 97.8 | 97.5 | 97.4 | 98.0 | 97.7 |
| ID | 154 | 148 | 178 | 169 | 184 | 218 | 163 | 169 |
| Image sticking | D | D | D | D | D | D | D | D |

TABLE 40

| | Comparative Example 81 | Comparative Example 82 | Comparative Example 83 | Comparative Example 84 | Comparative Example 85 | Comparative Example 86 | Comparative Example 87 | Comparative Example 88 |
|---|---|---|---|---|---|---|---|---|
| Liquid crystal composition | Comparative liquid crystal composition 11 | Comparative liquid crystal composition 11 | Comparative liquid crystal composition 11 | Comparative liquid crystal composition 11 | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 | Color filter 5 | Color filter 6 | Color filter 8 | Color filter 10 |
| VHR | 98.3 | 98.2 | 97.7 | 98.1 | 97.4 | 97.3 | 98.3 | 97.9 |
| ID | 149 | 145 | 182 | 166 | 184 | 212 | 154 | 167 |
| Image sticking | C | C | D | D | D | D | D | D |

In the liquid crystal display devices of Comparative Examples 65 to 88, the VHRs were decreased and the IDs were increased compared with the liquid crystal display devices of the present invention. In the evaluation of image sticking, a residual image was observed, which was at an unacceptable level.

Comparative Examples 89 to 112

Liquid crystal display devices of Comparative Examples 89 to 112 were produced in the same manner, except that the color filters 7, 9, and 11 listed in Table 2 were used instead of the color filter 1 in Examples 9, 25, 33, 49, 73, 89, 113, and 121. The VHR and ID were measured. The image sticking of the liquid crystal display devices was also evaluated. Tables 41 to 43 show the results.

TABLE 41

|  | Comparative Example 89 | Comparative Example 90 | Comparative Example 91 | Comparative Example 92 | Comparative Example 93 | Comparative Example 94 | Comparative Example 95 | Comparative Example 96 |
|---|---|---|---|---|---|---|---|---|
| Liquid crystal composition | Liquid crystal composition 2 | Liquid crystal composition 4 | Liquid crystal composition 5 | Liquid crystal composition 7 | Liquid crystal composition 10 | Liquid crystal composition 12 | Liquid crystal composition 15 | Liquid crystal composition 16 |
| Color filter | Color filter 7 | Color filter 7 | Color filter 7 | Color filter 7 | Color filter 7 | Color filter 7 | Color filter 7 | Color filter 7 |
| VHR | 98.5 | 98.4 | 98.4 | 98.3 | 98.3 | 98.5 | 98.5 | 98.2 |
| ID | 108 | 116 | 117 | 129 | 120 | 114 | 127 | 130 |
| Image sticking | C | D | C | D | D | D | D | D |

TABLE 42

|  | Comparative Example 97 | Comparative Example 98 | Comparative Example 99 | Comparative Example 100 | Comparative Example 101 | Comparative Example 102 | Comparative Example 103 | Comparative Example 104 |
|---|---|---|---|---|---|---|---|---|
| Liquid crystal composition | Liquid crystal composition 2 | Liquid crystal composition 4 | Liquid crystal composition 5 | Liquid crystal composition 7 | Liquid crystal composition 10 | Liquid crystal composition 12 | Liquid crystal composition 15 | Liquid crystal composition 16 |
| Color filter | Color filter 9 | Color filter 9 | Color filter 9 | Color filter 9 | Color filter 9 | Color filter 9 | Color filter 9 | Color filter 9 |
| VHR | 98.6 | 98.5 | 98.4 | 98.5 | 98.4 | 98.6 | 98.5 | 98.3 |
| ID | 105 | 107 | 112 | 123 | 115 | 106 | 116 | 124 |
| Image sticking | C | C | D | D | D | D | D | D |

TABLE 43

|  | Comparative Example 105 | Comparative Example 106 | Comparative Example 107 | Comparative Example 108 | Comparative Example 109 | Comparative Example 110 | Comparative Example 111 | Comparative Example 112 |
|---|---|---|---|---|---|---|---|---|
| Liquid crystal composition | Liquid crystal composition 2 | Liquid crystal composition 4 | Liquid crystal composition 5 | Liquid crystal composition 7 | Liquid crystal composition 10 | Liquid crystal composition 12 | Liquid crystal composition 15 | Liquid crystal composition 16 |
| Color filter | Color filter 11 | Color filter 11 | Color filter 11 | Color filter 11 | Color filter 11 | Color filter 11 | Color filter 11 | Color filter 11 |
| VHR | 98.5 | 98.4 | 98.2 | 98.2 | 98.3 | 98.3 | 98.4 | 98.2 |
| ID | 115 | 120 | 124 | 137 | 133 | 127 | 136 | 139 |
| Image sticking | D | D | D | D | D | D | D | D |

In the liquid crystal display devices of Comparative Examples 89 to 112, the VHRs were decreased and the IDs were increased compared with the liquid crystal display devices of the present invention. In the evaluation of image sticking, a residual image was observed, which was at an unacceptable level.

The invention claimed is:
1. A liquid crystal display device comprising a first substrate, a second substrate, a liquid crystal composition layer sandwiched between the first substrate and the second substrate, a color filter constituted by a black matrix and at least RGB three-color pixel portions, a pixel electrode, and a common electrode, wherein the liquid crystal composition layer contains a liquid crystal composition that contains one or more compounds represented by general formula (I),

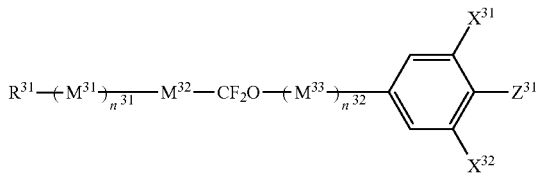

in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— in the trans-1,4-cyclohexylene group may be substituted with —O— unless oxygen atoms are directly next to each other, and one or two hydrogen atoms in the phenylene group may be substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and when a plurality of $M^{31}$ and $M^{33}$ are present, the plurality of $M^{31}$ may be the same or different and the plurality of $M^{33}$ may be the same or different and that contains one or more compounds selected from the group consisting of compounds represented by general formula (II-b) to general formula (II-f),

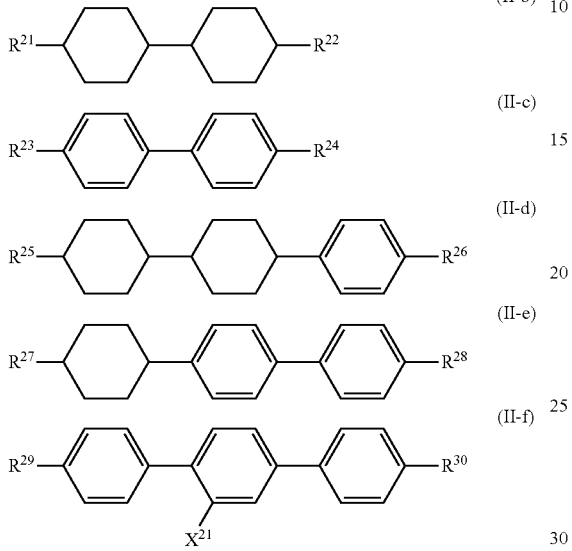

in the formulae, $R^{21}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom, the color filter is a color filter containing an organic pigment, and in the color filter, a volume fraction of particles having a particle size of more than 1000 nm relative to all particles of the organic pigment is 1% or less, and a volume fraction of particles having a particle size of 40 nm or more and 1000 nm or less relative to all particles of the organic pigment is 25% or less.

2. The liquid crystal display device according to claim 1, wherein in the color filter, the volume fraction of particles having a particle size of 40 nm or more and 1000 nm or less relative to all particles of the organic pigment is 15% or less.

3. The liquid crystal display device according to claim 1, wherein in the color filter, a volume fraction of particles having a particle size of 100 nm or more and 1000 nm or less relative to all particles of the organic pigment is 7% or less.

4. The liquid crystal display device according to claim 1, wherein the organic pigment has a maximum transmission wavelength of 600 nm or more and 700 nm or less.

5. The liquid crystal display device according to claim 1, wherein the organic pigment has a maximum transmission wavelength of 500 nm or more and 600 nm or less.

6. The liquid crystal display device according to claim 1, wherein the organic pigment has a maximum transmission wavelength of 400 nm or more and 500 nm or less.

7. The liquid crystal display device according to claim 1, wherein the organic pigment is dispersed in a coating film formed on a glass substrate.

8. The liquid crystal display device according to claim 1, wherein the compounds represented by the general formula (I) are compounds represented by general formula (I-a) to general formula (I-f),

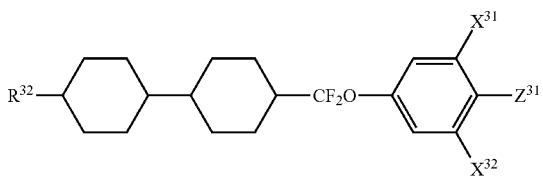

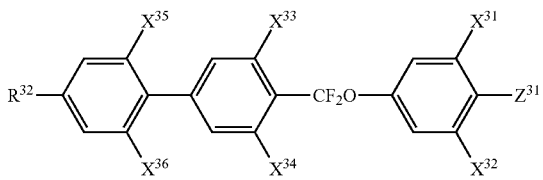

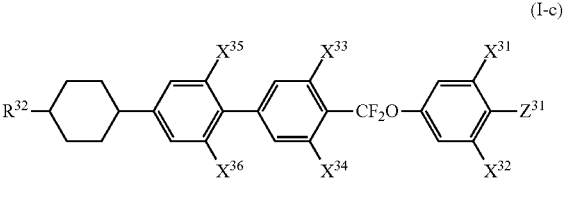

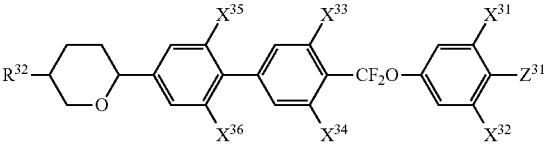

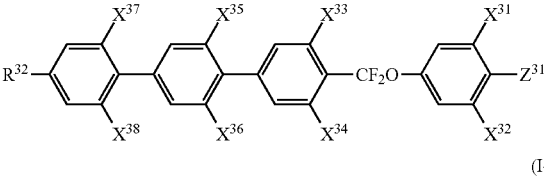

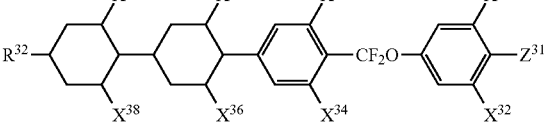

in the formulae, $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group, or a trifluoromethyl group.

9. The liquid crystal display device according to claim 1, wherein the liquid crystal composition layer further contains one or more compounds selected from the group consisting of compounds represented by general formula (III-a) to general formula (III-f),

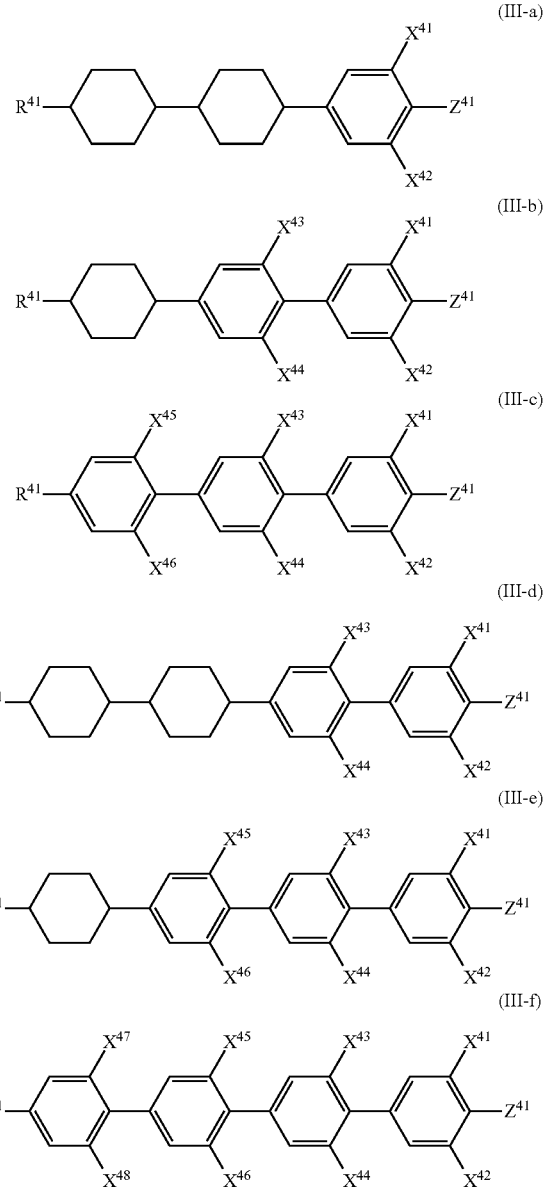

in the formulae, $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group.

10. The liquid crystal display device according to claim 1, wherein the liquid crystal composition layer contains a polymer obtained by polymerizing a liquid crystal composition containing one or more polymerizable compounds.

11. The liquid crystal display device according to claim 1, wherein the liquid crystal composition layer further contains a bifunctional monomer represented by general formula (V),

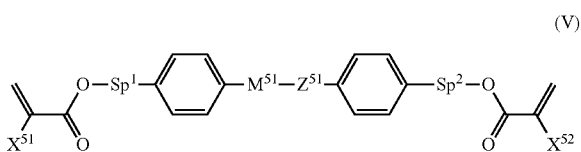

(V)

in the formula, $X^{51}$ and $X^{52}$ each independently represent a hydrogen atom or a methyl group;

Sp$^1$ and Sp$^2$ each independently represent a single bond, an alkylene group having 1 to 8 carbon atoms, or —O—(CH$_2$)$_s$— where s represents an integer of 2 to 7 and the oxygen atom bonds to an aromatic ring; $Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— where Y$^1$ and Y$^2$ each independently represent a fluorine atom or a hydrogen atom, —C≡C—, or a single bond; and M$^{51}$ represents a 1,4-phenylene group, a trans-1,4-cyclohexylene group, or a single bond and, in all the 1,4-phenylene groups in the formula, any of hydrogen atoms may be substituted with fluorine atoms.

* * * * *